US009538696B2

(12) United States Patent
Katupitiya et al.

(10) Patent No.: US 9,538,696 B2
(45) Date of Patent: Jan. 10, 2017

(54) GUIDANCE AND CONTROL OF VEHICLE TRAVEL PATH AND COMPONENTS

(71) Applicants: Jayantha Katupitiya, Lidcombe (AU); Raymond Paul Eaton, Balgowlah (AU)

(72) Inventors: Jayantha Katupitiya, Lidcombe (AU); Raymond Paul Eaton, Balgowlah (AU)

(73) Assignee: Newsouth Innovations Pty Ltd, Sydney, NSW (AU)

( * ) Notice: Subject to any disclaimer, the term of this patent is extended or adjusted under 35 U.S.C. 154(b) by 107 days.

(21) Appl. No.: 14/344,853

(22) PCT Filed: Sep. 19, 2012

(86) PCT No.: PCT/AU2012/001123
§ 371 (c)(1),
(2) Date: Mar. 13, 2014

(87) PCT Pub. No.: WO2013/040635
PCT Pub. Date: Mar. 28, 2013

(65) Prior Publication Data
US 2015/0019081 A1  Jan. 15, 2015

(30) Foreign Application Priority Data

Sep. 20, 2011  (AU) ................. 2011903865

(51) Int. Cl.
*A01B 69/04*  (2006.01)
*B62D 15/02*  (2006.01)
(Continued)

(52) U.S. Cl.
CPC ........... *A01B 69/008* (2013.01); *A01B 69/006* (2013.01); *B62D 6/00* (2013.01); *B62D 15/027* (2013.01)

(58) Field of Classification Search
CPC ....... A01B 69/008; A01B 69/006; B62D 6/00; B62D 15/027; A01C 7/208
(Continued)

(56) References Cited

U.S. PATENT DOCUMENTS 4,180,133 A    12/1979  Collogan et al.
6,148,255 A *  11/2000  van der Lely ....... A01B 69/008
                                                701/466
(Continued)

FOREIGN PATENT DOCUMENTS

CN    101622924 B    1/2010
EP    0985336 B1     3/2000
(Continued)

OTHER PUBLICATIONS

International Search Report and Written Opinion, mailed Dec. 18, 2012, by the Australian Patent Office for corresponding PCT Patent Application No. PCT/AU2012/001123, 17 pages.
(Continued)

*Primary Examiner* — John Q Nguyen
*Assistant Examiner* — Michael Kerrigan
(74) *Attorney, Agent, or Firm* — Klarquist Sparkman, LLP

(57) ABSTRACT

A vehicle, a tool carriage assembly, and a system are disclosed. The vehicle includes drive wheels and a steering assembly which are responsive to control signal(s) to substantially correct a displacement error of the vehicle relative to an intended travel path. The tool carriage assembly includes a support section operatively mounted to a main body for relative movement. The support section is adapted to have mounted thereto a tool unit comprising a tool head. In response to a displacement error of the tool head relative to the intended travel path, the support section is responsive to one or more control signals to move relative to the main (Continued)

body to substantially correct the displacement error of the tool head. The system includes the vehicle having the tool carriage assembly mounted thereto, and a control system for controlling the correction of the displacement errors of the vehicle and the tool head.

25 Claims, 15 Drawing Sheets

(51) Int. Cl.
*A01B 69/08* (2006.01)
*B62D 6/00* (2006.01)

(58) Field of Classification Search
USPC ............... 172/278, 297, 310, 315, 317, 324, 584,172/605, 613, 667, 712
See application file for complete search history.

(56) References Cited

U.S. PATENT DOCUMENTS

| | | | | |
|---|---|---|---|---|
| 9,037,346 | B2* | 5/2015 | Keys, II | B60D 1/248 701/1 |
| 2002/0133279 | A1* | 9/2002 | Manring | B62D 55/125 701/50 |
| 2004/0111202 | A1* | 6/2004 | Mailer | A01B 69/004 701/50 |
| 2004/0217575 | A1* | 11/2004 | Beaujot | A01C 7/208 280/442 |
| 2011/0127093 | A1 | 6/2011 | Koga et al. | |

FOREIGN PATENT DOCUMENTS

| | | |
|---|---|---|
| EP | 1709856 B1 | 10/2006 |
| JP | S5774277 | 5/1982 |
| JP | H0851807 | 2/1996 |
| JP | H0970203 | 3/1997 |
| WO | WO9522041 A1 | 8/1995 |

OTHER PUBLICATIONS

V. T. Huynh, J. Katupitiya, N.-M. Kwok and R. P. Eaton, "Derivation of an error model for tractor-trailer path tracking," *Intelligent Systems and Knowledge Engineering (ISKE)*, 2010 International Conference on, pp. 60-66, Nov. 15-16, 2010.
R. Eaton, H. Pota and J. Katupitiya, "Path tracking control of agricultural tractors with compensation for steering dynamics," Decision and Control, 2009 held jointly with the 2009 28th Chinese Control Conference. CDC/CCC 2009. *Proceedings of the 48th IEEE Conference on*, pp. 7357-7362, Dec. 15-18, 2009.
Jun Zhao, M. Whitty and J. Katupitiya, "Detection of non-flat ground surfaces using V-Disparity images," *Intelligent Robots and Systems*, 2009. IROS 2009. IEEE/RSJ International Conference on, pp. 4584-4589, Oct. 10-15, 2009.
K. W. Siew, J. Katupitiya, R. Eaton and H. Pota, "Simulation of an articulated tractor-implement-trailer model under the influence of lateral disturbances," *Advanced Intelligent Mechatronics*, 2009. AIM 2009. IEEE/ASME International Conference on, pp. 951-956, Jul. 14-17, 2009.
R. Eaton, J. Katupitiya, H. Pota and K. W. Siew, "Robust sliding mode control of an agricultural tractor under the influence of slip," *Advanced Intelligent Mechatronics*, 2009. AIM 2009. IEEE/ASME International Conference on , pp. 1873-1878, Jul. 14-17, 2009.

R. Eaton, J. Katupitiya, K. W. Siew and B. Howarth, "Autonomous Farming: Modeling and Control of Agricultural Machinery in a Unified Framework," *Mechatronics and Machine Vision in Practice*, 2008. M2VIP 2008. 15th International Conference on , pp. 499-504, Dec. 2-4, 2008.
H. Pota, R. Eaton, J. Katupitiya and S. D. Pathirana, "Agricultural robotics: A streamlined approach to realization of Autonomous Farming," *Industrial and Information Systems*, 2007. ICIIS 2007. International Conference on , pp. 85-90, Aug. 9-11, 2007.
R. Eaton, J. Katupitiya, K. W. Siew and K. S. Dang, "Precision Guidance of Agricultural Tractors for Autonomous Farming," *Systems Conference*, 2008 2nd Annual IEEE , pp. 1-8, Apr. 7-10, 2008.
H. Pota, J. Katupitiya and R. Eaton, "Simulation of a tractor-implement model under the influence of lateral disturbances," *Decision and Control*, 2007 46th IEEE Conference on , pp. 596-601, Dec. 12-14, 2007.
J. Katupitiya, R. Eaton and T. Yaqub, "Systems Engineering Approach to Agricultural Automation: New Developments," *Systems Conference*, 2007 1st Annual IEEE, pp. 1-7, Apr. 9-13, 2007.
P. Hingwe, A. K. Packard, and M. Tomizuka, "Linear parameter varying controller for automated lane guidance-experimental study on tractor semi-trailers," IEEE Transactions on Control Systems, vol. 10, pp. 793-806, Nov. 2002.
Z. Leng and M. A. Minor, "A simple tractor-trailer backing control law for path following with side-slope compensation," in Proc. IEEE Int Robotics and Automation (ICRA) Conf, pp. 2386-2391, 2011.
F. Lamiraux, S. Sekhavat, and J.-P. Laumond, "Motion planning and control for hilare pulling a trailer," *IEEE Transactions on Robotics and Automation*, vol. 15, pp. 640-652, 1999.
D.-H. Kim and J.-H. Oh, "Globally asymptotically stable tracking control for a trailer system," *Journal of Robotic Systems*, vol. 19, pp. 199-205, 2002.
D. W. Hodo, J. Y. Hung, D. M. Bevly, and D. S. Millhouse, "Analysis of trailer position error in an autonomous robot-trailer system with sensor noise," in *IEEE International Symposium on Industrial Electronics*, Caixanova—Vigo, Spain, pp. 2107-2112, 2007.
C. Pradalier and K. Usher, "A simple and efficient control scheme to reverse a tractor-trailer system on a trajectory," in *IEEE Conference on Robotics and Automation*, Rome, Italy, pp. 2208-2214, 2007.
S. Gan-Mor, R. L. Clark, and B. L. Upchurch, "Implement lateral position accuracy under rtk-gps tractor guidance," *Computers and Electronics in Agriculture*, vol. 59, pp. 31-38, 2007.
C. Pradalier and K. Usher, "Robust trajectory tracking for a reversing tractor trailer," *Journal of Field Robotics*, vol. 25, pp. 378-399, 2008.
R. Orosco-Guerrero, E. Aranda-Bricaire, and M. Velasco-Villa, "Modeling and dynamic feedback linearization of a multi-steered n-trailer," in *Proceedings of the 2002 IFAC, 15th Triennial Congress*, Barcelona, Spain, 6 pages, 2002.
R. DeSantis, "Path tracking for a tractor-trailer-like robot," *International Journal of Robotics Research*, vol. 61, pp. 553-544, 1994.
A. Astolfi, P. Bolzern, and A. Locatelli, "Path-tracking of a tractor-trailer vehicle along rectilinear and circular paths: a lyapunov-based approach," *IEEE Transactions on Robotics and Automation*, vol. 20, pp. 154-60, 2004.
V. T. Huynh, "Model development and control for an agricultural tractor-trailer under the influence of Slips", available at unsworks. unsw.edu.au/fapi/datastream/unsworks:9930/SOURCE02, 109 pages, Jun. 2011.
C. Demers-Roy et al., "Assisted guidance for a tractor-trailer with off axle hitching," *IFAC Intelligent Autonomous Vehicles*, pp. 751-755, 2004.

* cited by examiner

GUIDANCE AND CONTROL OF VEHICLE TRAVEL PATH AND COMPONENTS

CROSS REFERENCE TO RELATED APPLICATIONS

This is the U.S. National Stage of International Application No. PCT/AU2012/001123, filed Sep. 19, 2012, which was published in English under PCT Article 21(2), which in turn claims priority to and the benefit of Australian Patent Application No. 2011903865, filed Sep. 20, 2011.

TECHNICAL FIELD

This disclosure relates generally to vehicles and to guidance and control of such vehicles for controlling the travel path thereof or the positioning of components of the vehicle.

The vehicle may be adapted for many applications. In one particular application the vehicle is suitable for use as a seeding apparatus and as a matter of convenience the following description will be with reference to that particular application. It is to be understood that this is not to be considered in any way a limitation on the disclosure as the vehicle may find application in other areas. Examples of other agricultural applications may include cultivators, harvesters, sprayers and mowers. The vehicle may also in certain applications be adapted to be attached to another vehicle so as to be towed.

BACKGROUND OF THE DISCLOSURE

In many operations including farming operations, such as seeding, it is most desirable that a tractor and towed vehicle travel along an intended travel path. In some cases the vehicle is adapted to be towed by another vehicle such as a tractor. In such cases the towed vehicle simply passively follows the tractor as it travels along the travel path. Often, however, maintaining the vehicle on an intended travel path is difficult to achieve because of unwanted displacement of the vehicle from the travel path as, for example, gravitational forces placed on the vehicle as a result of sloping land; differential and imbalanced soil reaction forces on fertilizer ploughs, stubble interference, loose soil and lateral slips when cornering at high speeds.

SUMMARY OF THE DISCLOSURE

In a first aspect there is provided a vehicle comprising a chassis having a forward and a rearward end, a traction drive comprising at least two drive wheels operatively mounted to the chassis for causing propulsion of the vehicle, and a steering assembly for facilitating steering of the drive wheels when in an operating mode, wherein in response to a displacement error of the vehicle relative to an intended travel path, the drive wheels and steering assembly are responsive to one or more control signals to substantially correct the displacement error of the vehicle relative to the intended travel path.

In certain embodiments, the vehicle includes hydraulic motors, each motor being associated with a respective drive wheel for driving thereof to substantially correct the displacement error of the vehicle relative to the intended travel path.

In certain embodiments, the hydraulic motors are torque controlled to provide substantially the same torque to each hydraulic motor.

In certain embodiments, the steering assembly comprises a linkage arrangement operatively interconnecting the drive wheels and a steering actuator, wherein the steering actuator is responsive to one of the control signals to substantially correct the displacement error of the vehicle relative to the intended travel path.

In certain embodiments, the vehicle includes a tool carriage assembly operatively mounted to the chassis and comprising a support section adapted to have mounted thereto a tool unit having a tool head, and an actuator; wherein in response to a displacement error of the tool head relative to the intended travel path, the actuator is responsive to one of the control signals to substantially correct the displacement error of the tool head relative to the intended travel path.

In certain embodiments, the vehicle includes a coupling hitch for attachment to a leading vehicle, the coupling hitch including a force sensor to sense a force applied to the coupling hitch, wherein the drive wheels are responsive to one of the control signals based upon the force sensed by the force sensor.

In certain embodiments, the vehicle includes a valve block having a plurality of valves which are in fluid communication with a fluid reservoir, wherein the valve block includes an electrical interface which receives the one or more control signals and actuates at least some of the one or more valves to hydraulically control at least one of the drive wheels and the steering assembly.

In a second aspect there is provided a tool carriage assembly for a vehicle, the tool carriage assembly comprising a support section which in use is operatively mounted to a main body of the vehicle for relative movement thereto, the support section being adapted to have mounted thereto a tool unit comprising a tool head; wherein in response to a displacement error of the tool head relative to an intended travel path, the support section is responsive to one or more control signals to move relative to the main body to substantially correct the displacement error of the tool head relative to the intended travel path.

In certain embodiments, the tool carriage assembly includes an actuator which is operatively connected to the support section, wherein the actuator is responsive to one of the control signals to cause the support section to move relative to the main body to substantially correct the displacement error of the tool head relative to the intended travel path.

In certain embodiments, the tool unit is operatively mounted to the support section such that the relative movement between the support section and the main body of the vehicle causes a rotational movement of the tool unit about a pivot axis so that the tool head is displaced relative to the intended travel path.

In certain embodiments, the tool carriage assembly includes a base section operatively connected to the main body of the vehicle, the support section being operatively connected to the base section for relative movement thereto.

In certain embodiments, said support section comprises a carrier frame comprising side members and cross members operatively connected together so as to provide for a pivot connection between adjacent ends of the members so as to form a parallelogram-type linkage, the carrier frame being pivotally mounted to the base section at pivot points intermediate the ends of the opposed side members so that the side members can be moved in a rotating fashion relative to the base section.

In certain embodiments, the tool unit is mounted to the carrier frame with the tool head being spaced from a line which extends between the pivot points.

In certain embodiments, the tool carriage assembly includes a sub-frame associated with the tool unit, the sub-frame being pivotally secured to the cross members.

In certain embodiments, the base section is pivotally mounted to the main body of the vehicle at one side thereof so that it can be pivotally moved between raised and lowered positions.

In certain embodiments, the vehicle is a seeding apparatus, wherein the tool unit is a seeder unit comprising a seed deposition outlet, wherein as a result of the relative movement between the support section and the main body of the seeding apparatus, the seed deposition outlet is displaced relative to the intended travel path to substantially correct seed deposition.

In certain embodiments, the support section being adapted to have mounted thereto a plurality of tool units, wherein movement of the support section relative to the main body causes simultaneous displacement of the tool head of each tool unit relative to the intended travel path.

In a third aspect there is provided a vehicle according to the first aspect, further including a tool carriage assembly according to the second aspect, said tool carriage assembly being operatively mounted on the vehicle chassis.

In a fourth aspect there is provided a system including:
a vehicle according to third aspect; and
a control system including a controller and one or more sensors in communication with the controller, wherein the controller is configured to:
  receive one or more signals from the one or more sensors;
  determine, based on the one or more signals, the displacement error of the vehicle and the tool head relative to the intended travel path; and
  generate the one or more control signals according to displacement error of the vehicle and the tool head relative to the intended travel path.

In certain embodiments, the displacement error of the vehicle includes a linear displacement error of the vehicle relative to the intended travel path and an angular displacement error of the vehicle relative to the intended travel path, and the displacement error of the tool head includes a linear displacement error of the tool head relative to the intended travel path.

In certain embodiments, the one or more signals received from the one or more sensors are indicative of:
  a position of the vehicle;
  an orientation of the vehicle; and
  an offset position of the tool head.

In certain embodiments, the controller is configured to:
  calculate, based on the position of the vehicle, the orientation of the vehicle, and the offset position of the tool head, a position of the tool head;
  calculate, based on the position of the vehicle and orientation of the vehicle, the linear displacement error of the vehicle;
  calculate, based on the orientation of the vehicle, the angular displacement error of the vehicle; and
  calculate, based on the position of the tool head, the linear displacement error of the tool head.

In certain embodiments, the one or more sensors include:
  a position detection sensor for detecting the position of the vehicle;
  an orientation detection sensor for detecting the orientation of the vehicle; and
  a position sensor for detecting the offset position of the tool head.

In certain embodiments, the position detection sensor and the orientation detection sensor are provided as a pair of GPS (Global Positioning System) sensors.

In certain embodiments, the vehicle is adapted to be coupled to a leading vehicle.

In certain embodiments, the one or more signals received from the one or more sensors are indicative of:
  a position of the leading vehicle;
  an orientation of the leading vehicle;
  an angular displacement between the leading vehicle and the vehicle; and
  an offset position of the tool head.

In certain embodiments, the controller is configured to:
  calculate, based on the position of the leading vehicle and the orientation of the leading vehicle, a position of the vehicle;
  calculate, based on the angular displacement and the orientation of the leading vehicle, an orientation of the vehicle;
  calculate, based on the position of the vehicle, the orientation of the vehicle, and the offset position of the tool head, a position of the tool head;
  calculate, based on the position of the vehicle and the orientation of the vehicle, the linear displacement error of the vehicle;
  calculate, based on the orientation of the vehicle, the angular displacement error of the vehicle; and
  calculate, based on the position of the tool head, the linear displacement error of the tool head.

In certain embodiments, the one or more sensors include one or more of:
  a leading vehicle position detection sensor for detecting the position of the leading vehicle;
  a leading vehicle orientation detection sensor for detecting the orientation of the leading vehicle;
  an angular displacement sensor for detecting the angular displacement between the leading vehicle and the vehicle; and
  a position sensor for detecting an offset position of the tool head.

In certain embodiments, the leading vehicle position detection sensor and the leading vehicle orientation detection sensor are provided as a pair of GPS (Global Positioning System) sensors.

In certain embodiments, the system includes the leading vehicle.

In certain embodiments, the system includes a force sensor in communication with the controller which is provided at a coupling assembly between the vehicle and the leading vehicle for sensing a force applied at the coupling assembly, wherein the controller is configured to:
  receive a force signal from the force sensor;
  compare the sensed force indicated by the force signal against a force threshold value; and
  generate one or more controls signals to control the drive wheels.

In certain embodiments, the controller includes memory having stored therein intended travel path data indicative of the intended travel path, wherein the controller is configured to calculate the displacement error of the vehicle and the tool head relative to the intended travel path based on the intended travel path data.

In certain embodiments, the vehicle includes a valve block having a plurality of valves which are in fluid communication with a fluid reservoir, wherein the valve block includes an electrical interface which receives the one or more control signals generated by the controller and actuates at least some of the one or more valves to hydraulically control at least one of the drive wheels, the steering assembly, and the relative movement of the support section.

In certain embodiments, the support section being adapted to have mounted thereto a plurality of tool units, wherein movement of the support section relative to the main body causes simultaneous displacement of the tool head of each tool unit relative to the intended travel path.

In a fifth aspect there is provided a carriage assembly for seeding apparatus which can move along a travel path, the carriage assembly comprising a support section which in use is operatively mounted to a main body of the seeding apparatus for relative movement thereto, the support section being adapted to have mounted thereto at least one seeder unit, the seeding unit comprises a seeding tube and a fertilizer plough having a ground engaging tip portion; wherein as a result of the relative movement between the support section and the main body of the seeding apparatus the seeding tube can be laterally displaced relative to the travel path to maintain seed deposition along an intended path despite unexpected lateral shifts of the seeding apparatus when in use.

In certain embodiments, the or each seed tube is operatively mounted to the support section such that the relative movement between the support section and the main body of the seeding apparatus causes a rotational movement of the seed tube about a pivot axis so that the seed tube is laterally displaced relative to the travel path.

In certain embodiments, the carriage assembly includes a base section operatively connected to the main body of the seeding apparatus, the support section being operatively connected to the base section for relative movement thereto.

In certain embodiments the support section may comprise a carrier frame comprising side members and cross members operatively connected together so as to provide for a pivot connection between adjacent ends of the members forming a parallelogram-type linkage, the carrier frame being pivotally mounted to the base section at pivot points intermediate the ends of the opposed side members so that the side members can be moved in a rotating fashion relative to the base section.

In certain embodiments the or each seeding unit may be mounted to the support section with the tip portion of the fertilizer plough extending through a line which extends between the pivot points.

In certain embodiments the carriage may further include a sub-frame associated with each seeding unit, each sub-frame being pivotally secured at its ends to the cross members.

In certain embodiments the base section may be pivotally mounted to the main body of the seeding apparatus at one side thereof so that it can be pivotally moved between a raised position and a lowered position.

In certain embodiments the base section may comprise a square or rectangular base frame having opposed side and cross members secured together to form a rigid structure.

In a sixth aspect there is provided a vehicle comprising a chassis having a forward and a rearward end, a traction drive comprising at least two drive wheels operatively mounted to the chassis, a power unit for driving the drive wheels for causing propulsion of the vehicle, a steering assembly for facilitating steering of the drive wheels when in an operating mode, the drive wheels and steering assembly being associated with a control system which facilitates operation of the drive wheels and steering assembly such that in the event of a lateral displacement error in the position of the vehicle relative to an intended travel path causes lateral displacement of the vehicle to return it toward the intended travel path.

In certain embodiments the drive wheels and associated steering assembly being operable to maintain the vehicle along the intended travel path.

In certain embodiments the power unit may comprise hydraulic motors, each motor being associated with a respective drive wheel. In certain embodiments the hydraulic motors are torque controlled so as to provide substantially the same torque to each motor.

In certain embodiments the steering assembly may comprise a linkage arrangement operatively interconnecting the drive wheels and an actuator for activating the linkage arrangement to cause operation of the steering assembly.

In certain embodiments the actuator is operatively connected to a control system which is arranged to sense when the vehicle is not travelling along the intended travel path and actuate the actuator as to return the vehicle to the intended travel path.

In certain embodiments the power to the drive wheels can be increased or decreased in response to a controller.

In certain embodiments the vehicle may include a coupling hitch for attachment to a towing vehicle.

In a seventh aspect there is provided a tool carriage assembly for vehicular apparatus which can move along a travel path, the carriage assembly comprising a base section which in use is operatively mounted to a main body of the vehicular apparatus, a support section operatively connected to the base section for relative movement thereto, the support section being adapted to have mounted thereto at least one tool unit, the tool unit comprises a tool head; wherein as a result of the relative movement between the base section and the support section the tool head of the tool unit can be laterally displaced toward an intended travel path of the vehicular apparatus when in use.

In certain embodiments the carriage assembly is used in combination with the vehicle.

In an eighth aspect there is provided a system including:
a vehicle supporting a tool carriage according to the seventh aspect; and
a control system configured to:
obtain one or more signals from one or more sensors;
determine, based upon the one or more signals, a lateral displacement error; and
actuate, according to the lateral displacement error, an actuator to laterally adjust the position of the tool head.

In one form, the vehicle is adapted to be towed by a towing vehicle and the one or more signals are indicative of:
a position of the towing vehicle;
an orientation of the towing vehicle;
an angular displacement between the towing vehicle and the tool carriage; and
a position of the actuator.

In another form, the control system includes a controller in electrical communication with:
a position detection unit for detecting the position of the towing vehicle;
an orientation detection unit for detecting the orientation of the towing vehicle; and
an angular displacement unit for detecting the angular displacement between the towing vehicle and the vehicle; and
a position sensor for sensing the position of the actuator.

In one embodiment, the position detection unit and the orientation detection unit are provided as a pair of GPS (Global Positioning System) units.

In another embodiment, the angular displacement unit is an angular displacement potentiometer provided at a coupling hitch to sense an angular displacement of the vehicle relative to the towing vehicle.

In an alternate embodiment, the plurality of signals are indicative of:
  a position of the vehicle;
  an orientation of the vehicle; and
  a position of the actuator.

In one form, the control system includes a controller in electrical communication with a position detection unit for detecting the position of the vehicle and a position sensor for sensing the position of the actuator, wherein the controller has stored in memory intended travel path data, wherein the controller is configured to compare the position of the vehicle with the intended travel path data to determine the lateral displacement error and actuate the actuator according to the lateral displacement error and the position of the actuator. In an optional form, response to determining the lateral displacement error, the control system actuates one or more drive wheels of the vehicle to return the vehicle to the intended travel path.

In another optional form, in response to determining the lateral displacement error, the control system actuates a steering assembly of the vehicle to return the vehicle to the intended travel path.

In an optional embodiment, the tool is a seeding unit and the tool head is a seeding tube.

In another optional embodiment, the control system is configured to:
  receive a signal indicative of a velocity of the towing vehicle;
  adjust the velocity according to the position of the towing vehicle received over time;
  compare the adjusted velocity to an intended velocity value stored in memory of the control system to determine a velocity error; and
  actuate a velocity adjustment system of the towing vehicle according to the velocity error.

In a ninth aspect there is provided a system including:
  the vehicle according to the fifth aspect;
  the control system configured to:
    obtain a plurality of signals from one or more sensors;
    determine, based upon the plurality of signals, the lateral displacement error; and
    actuate, according to the lateral displacement error, the drive wheels and steering assembly to return the vehicle to the intended travel path.

In one form, the vehicle is adapted to be towed by a towing vehicle and the plurality of signals are indicative of:
  a position of the towing vehicle;
  an orientation of the towing vehicle; and
  an angular displacement between the towing vehicle and the tool carriage.

In another form, the control system includes a controller in electrical communication with:
  a position detection unit for detecting the position of the towing vehicle;
  an orientation detection unit for detecting the orientation of the towing vehicle; and
  an angular displacement unit for detecting the angular displacement between the towing vehicle and the vehicle.

In one embodiment, the position detection unit and the orientation detection unit are provided as a pair of GPS (Global Positioning System) units.

In another embodiment, the angular displacement unit is an angular displacement potentiometer provided at a coupling hitch to sense an angular displacement of the vehicle relative to the towing vehicle.

In an alternate form, the one or more signals are indicative of a position of the vehicle.

In one form, the control system includes a controller in electrical communication with a position detection unit for detecting the position of, the vehicle, wherein the controller has stored in memory intended travel path data, wherein the controller is configured to compare the position of the vehicle with the intended travel path data to determine the lateral displacement error and actuate, according to the lateral displacement error, the drive wheels and steering assembly to return the vehicle to the intended travel path.

In an optional form, the support section has mounted thereto at least one tool unit including a tool head, wherein the controller receives, from a position sensor associated with an actuator for laterally displacing the tool head, a signal indicative of a position of the actuator, wherein in response to determining the lateral displacement error, the control system actuates the actuator, according to the position of the actuator, to laterally adjust the position of tool head.

In another optional form, the tool is a seeding unit and the tool head is a seeding tube.

In an optional embodiment, the control system is configured to:
  receive a signal indicative of a velocity of the towing vehicle;
  adjust the velocity according to the position of the towing vehicle received over time;
  compare the adjusted velocity to an intended velocity value stored in memory of the control system to determine a velocity error; and
  actuate a velocity adjustment system of the towing vehicle according to the velocity error.

Other aspects and embodiments will be appreciated throughout the detailed description.

DESCRIPTION OF THE FIGURES

The accompanying drawings facilitate an understanding of the various embodiments.

DETAILED DESCRIPTION

Figure 1:
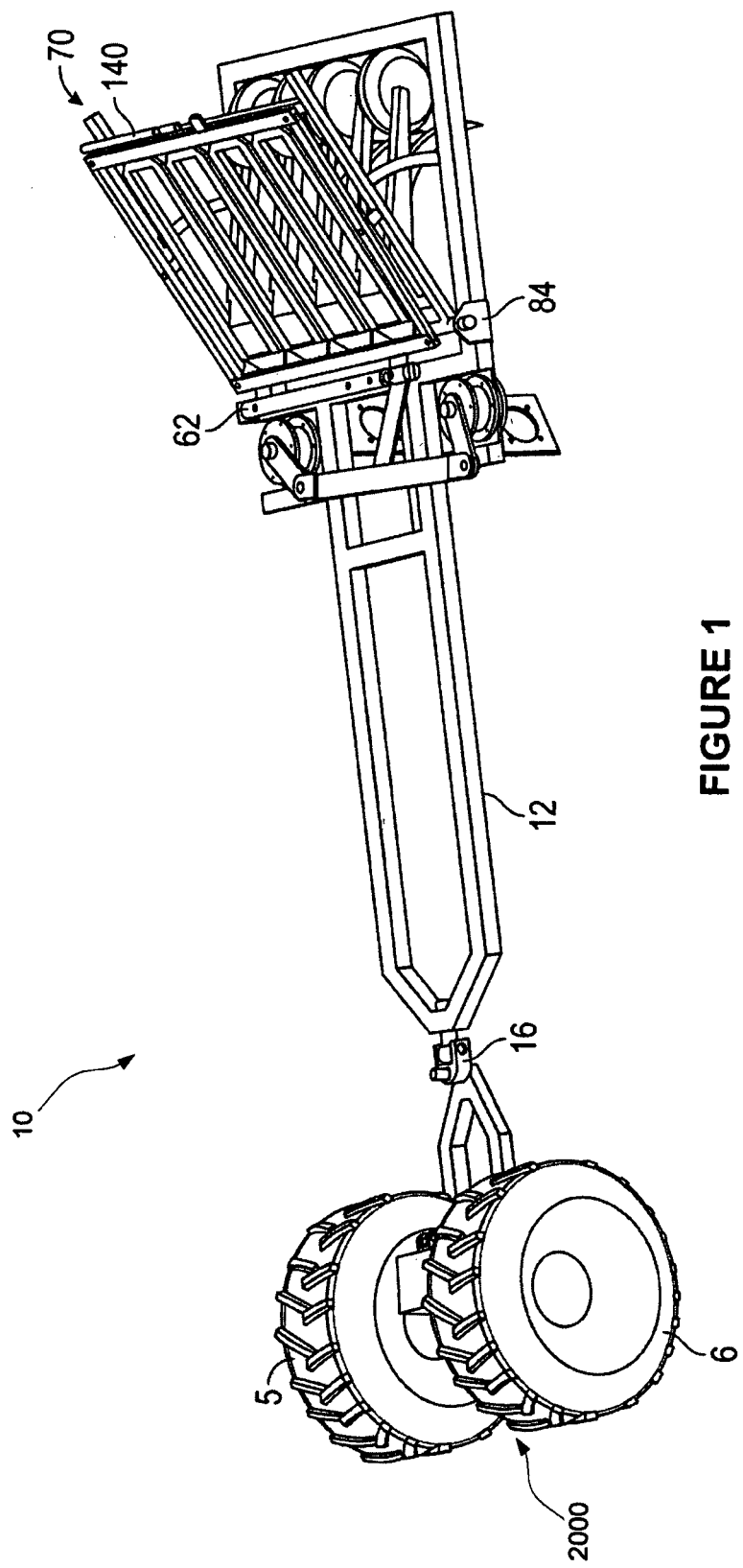
FIG. 1 illustrates an exemplary schematic view of a vehicle in accordance with one embodiment.
Figure 2:
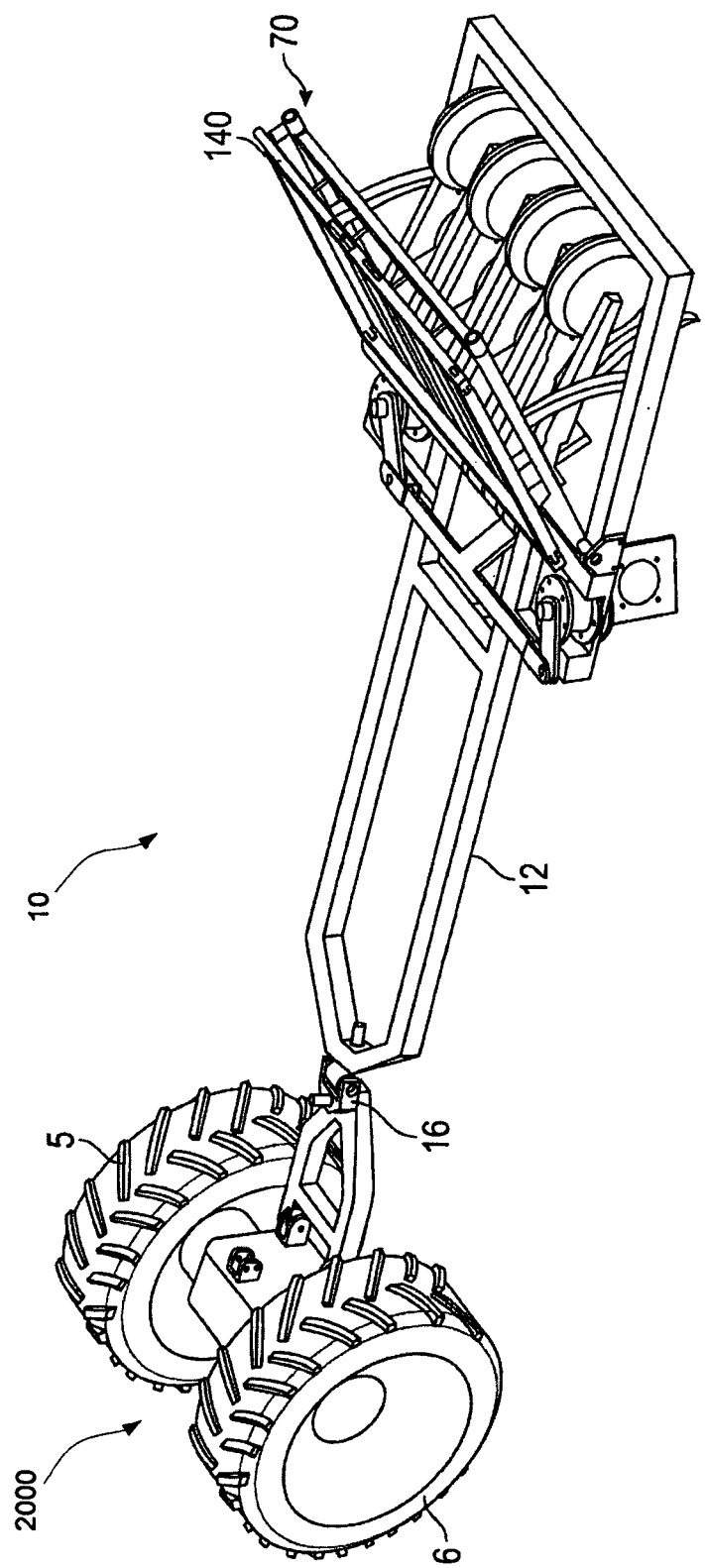
FIG. 2 illustrates the vehicle shown in FIG. 1 from another angle.
Figure 3:
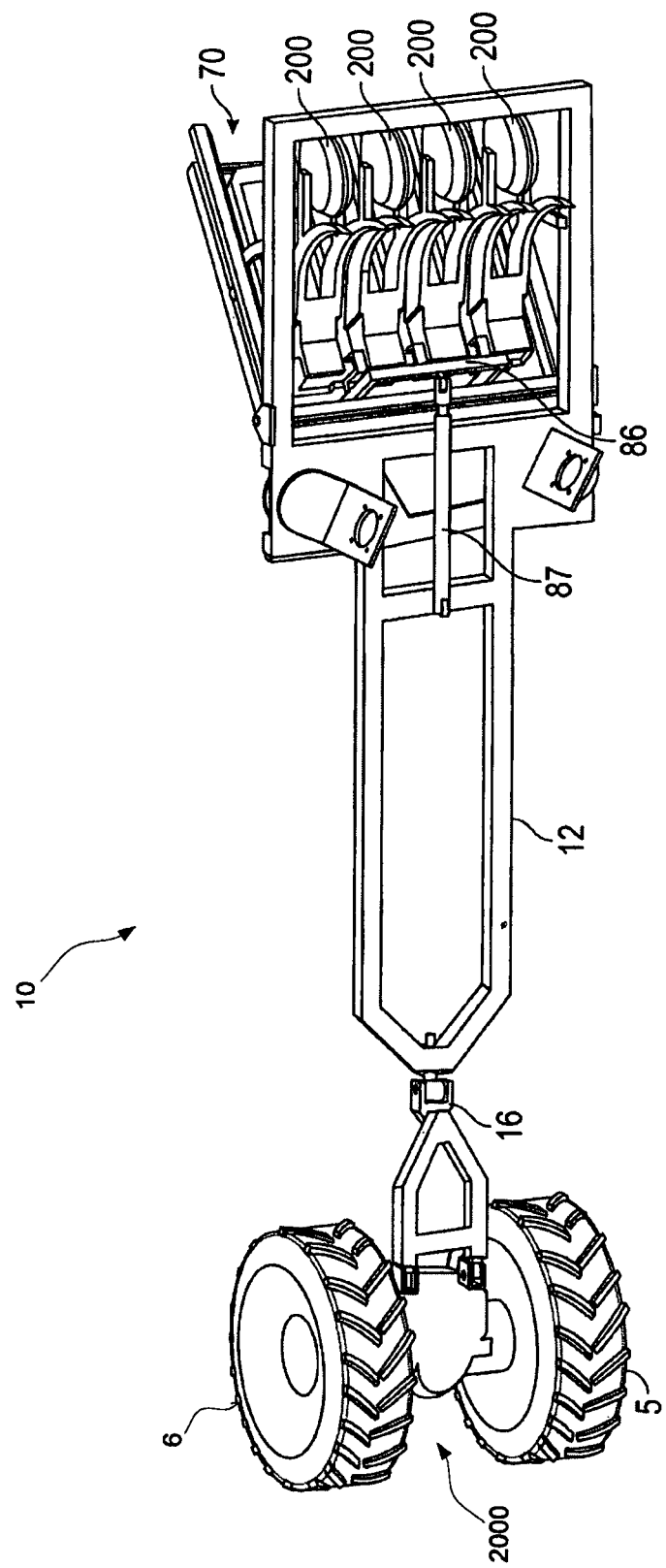
FIG. 3 illustrates the vehicle shown in FIG. 1 from another angle.
Figure 4A:
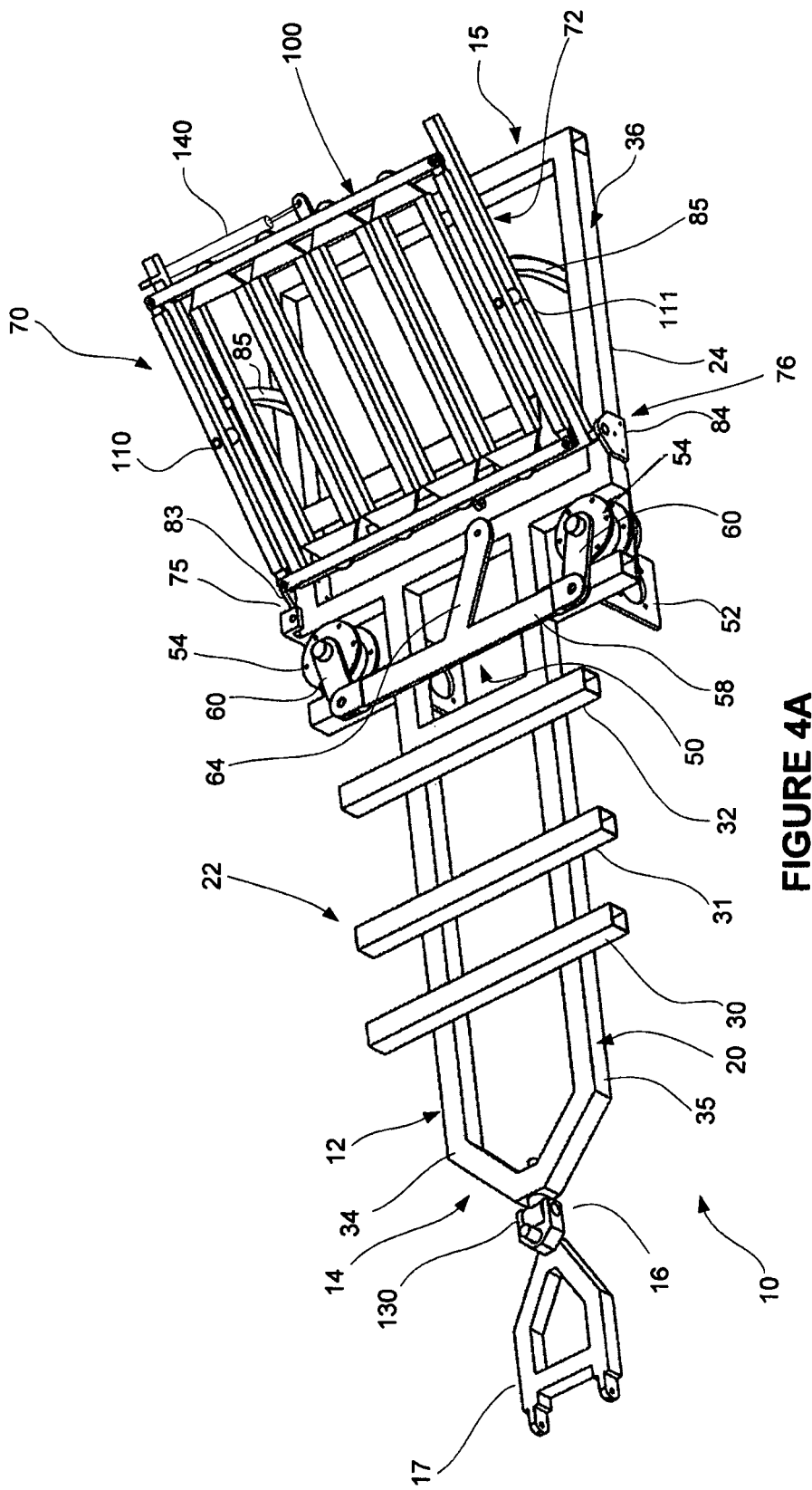
FIG. 4A illustrates an isometric view of another example of the vehicle including additional structural members.

Referring to the drawings, there is shown a vehicle which in the particular form illustrated is a seeding apparatus 10. The seeding apparatus 10 comprises a chassis 12 having a forward end 14 and a rearward end 15 (FIG. 4A). At the forward end 14 there is a coupling hitch 16 for connecting the apparatus 10 to a leading vehicle 2000. The leading vehicle 2000 may be in the form of a tractor (only the wheels 5 and 6 of the tractor are illustrated in FIGS. 1 to 3). The coupling hitch 16 may be configured for connection to a typical three point linkage of a tractor via a coupling 17.

Figure 5:
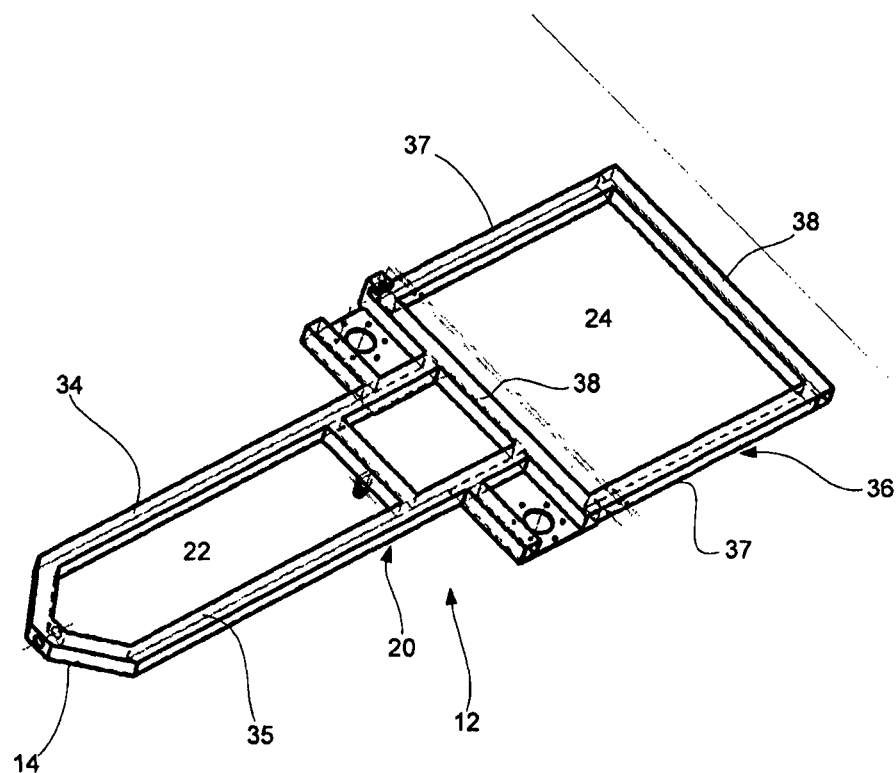
FIGS. 5 to 12 illustrate various components of the vehicle shown in FIG. 4A.
Figure 6:
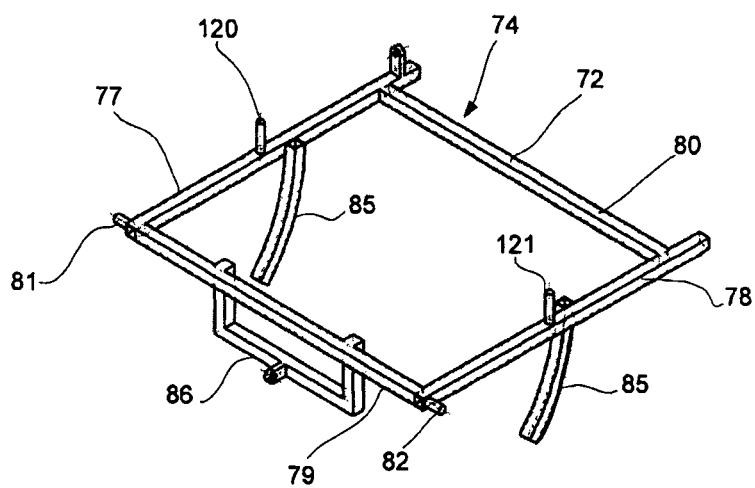
Figure 7:
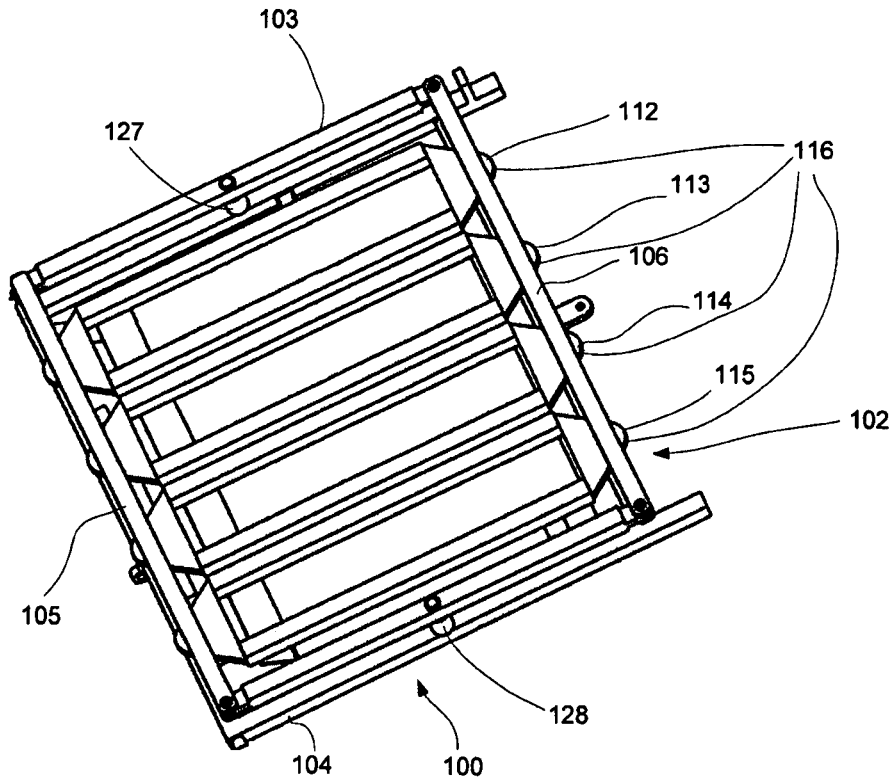
Figure 8:
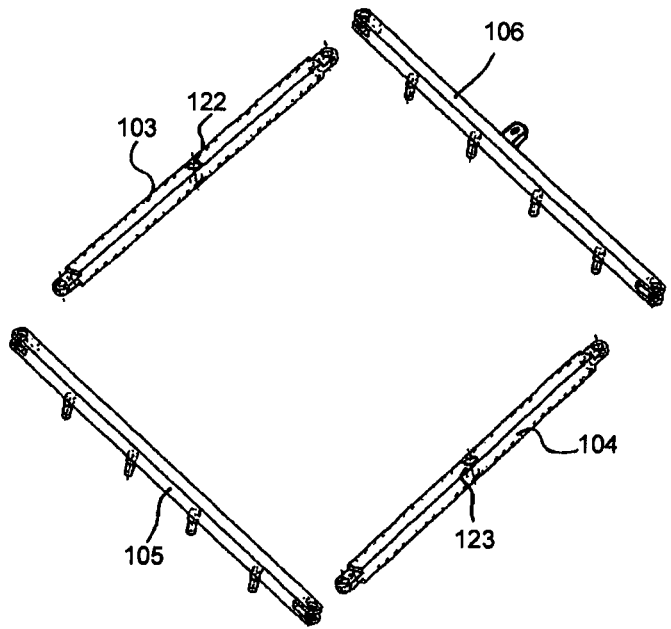

As best illustrated in FIG. 4A, the chassis 12 is in the form of an elongated frame 20 which includes parallel longitudinally extending beams 34 and 35 and a square or rectangular section 36 at the rearward end 15. The rectangular section 36 comprises side members 37 and cross members 38 (FIG. 5). As shown in FIG. 4A, a series of laterally extending cross beams 30, 31 and 32 are positioned towards the forward end 14. The laterally extending cross beams 30, 31 and 32 form a power unit support section 22 and the square or rectangular section 36 forms a seeder carriage assembly support section 24. The chassis 12 is shown as a frame however it could take other forms and as such the reference to a chassis is not limited to a frame.

Figure 16:
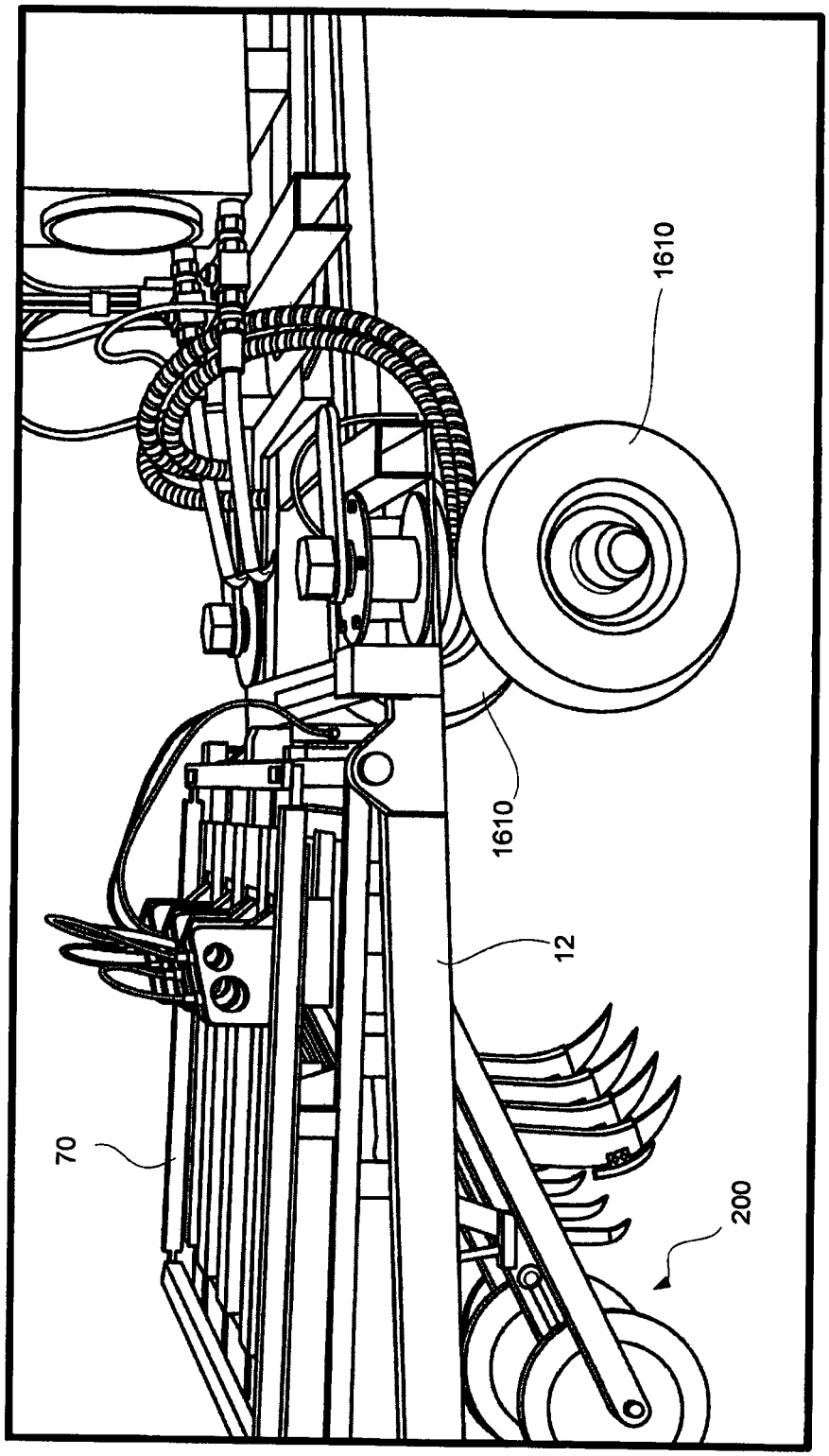
FIG. 16 illustrates a magnified side perspective view of a portion of the vehicle illustrating a tool carriage assembly in one of the lowered positions.

The vehicle 10 includes a traction drive which in this embodiment comprises a pair of drive wheels 1610 (see FIG. 16) which are adapted to be mounted to wheel mounts 52 and associated bearing sections 54. As shown in FIG. 4A, the drive wheels 1610 are steerable by steering mechanism 50 which includes steering arms 60 operatively connected to respective wheel mounts 52 and interconnected by cross bar 58. A steering actuator 62 in the form of a piston/cylinder 62 (shown in FIG. 1) causes movement of the cross bar 58 via connecting arm 64. The arrangement may form an Ackermann steering system.

Figure 14:
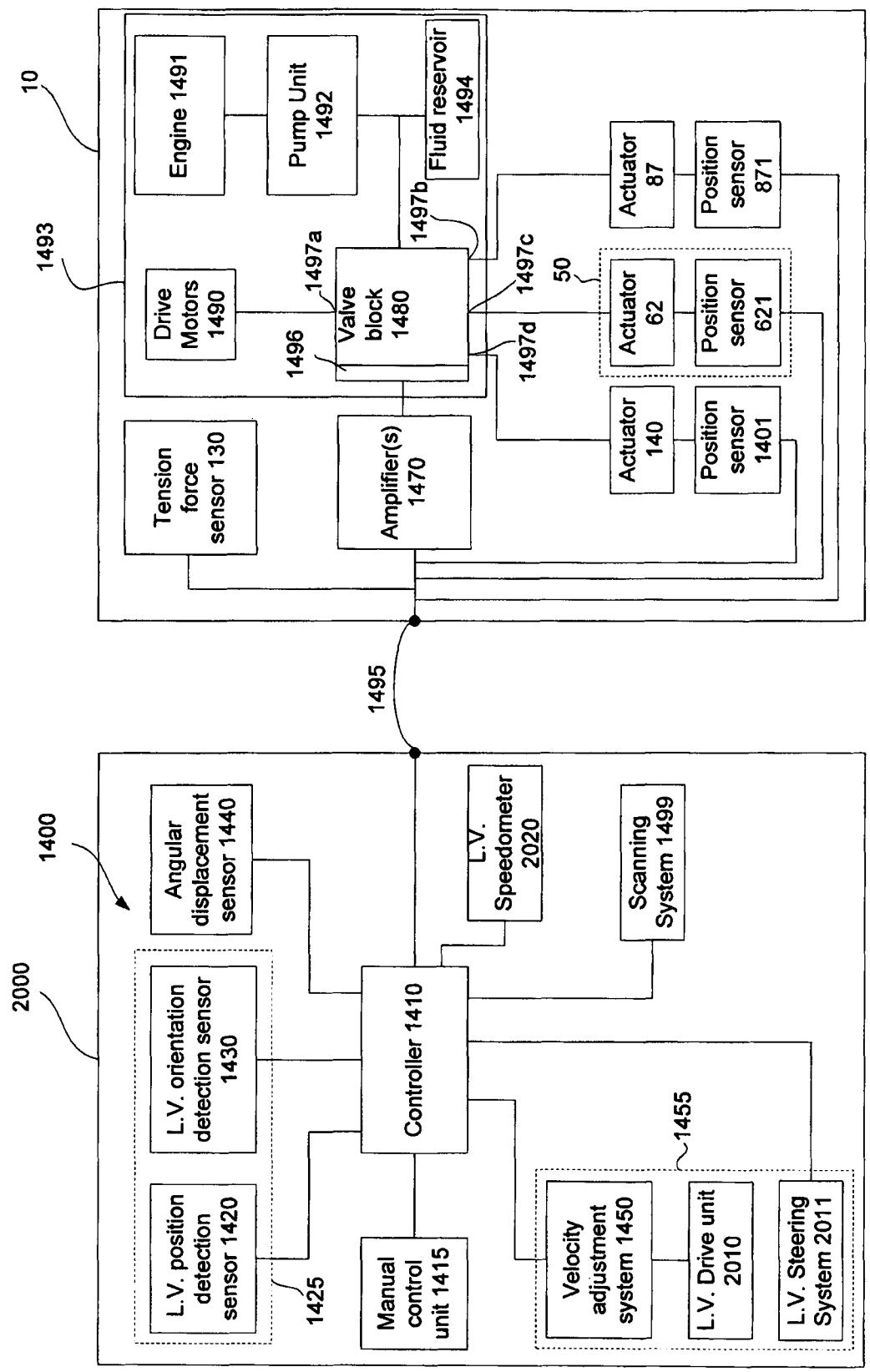
FIG. 14 illustrates a functional block diagram representing an example of a system including a control system and the vehicle coupled to a leading vehicle.

Referring to FIG. 14, the vehicle includes a power unit 1493 comprising an engine 1491 in the form of a diesel engine which is arranged to drive a hydraulic pump unit 1492. The pump unit 1492 comprises two hydraulic pumps. One pump is a load sensing, variable flow axial piston pump. This pump provides hydraulic pressure for all power operations and will be referred to as the primary pump. The other or secondary pump is a gear pump and is used to carry out off-line cooling and filtration. Both pumps draw hydraulic fluid from a reservoir in the form of a tank mounted on the main body.

The drive wheels 1610 are associated with a power unit 1493 to drive the wheels 1610. The power unit 1493 can include a plurality of hydraulic motors 1490. In particular, each drive wheel 1610 has associated therewith a respective hydraulic motor 1490. The two motors are torque controlled so as to provide substantially the same torque to each motor 1490 during operation. As a result of this arrangement substantially the same driving force will be delivered to each motor 1490 along any travel path (straight or curved) although the motors 1490 may run at different speeds. This is because the motors 1490 are subject to the same hydraulic pressure rather than the same hydraulic fluid flow rate. The system provides for, in effect, a differential arrangement between the drive wheels.

The provision of the powered steerable drive wheels 1610 enables substantial correction of the position and orientation of the vehicle 10; that is, the steerable drive wheels 1610 can compensate for unwanted movement of the vehicle such as sliding or skewing movement of the vehicle 10 from an intended travel path. A control system 1400 is used for this purpose which will be described hereinafter.

As shown in FIG. 4A the apparatus 10 can further include a tension force sensor 130 in the main body 12 which can sense the tension force in the coupling between the leading vehicle 2000 and the main body of the apparatus 10. The force sensor 130 can be associated with an eye-bolt 131 (see FIG. 4B). The sensor 130 is associated with a control system 1400 (see FIG. 14) which facilitates propulsive power distribution between the leading vehicle 2000 and the apparatus 10. The sensor 130 is set at a preload so that the drive wheels 1610 will only commence driving when that preload is exceeded. During operation when the vehicle 10 is operating, the leading vehicle 2000 is designed to operate as a pilot vehicle and hence generally does not produce enough power to tow the apparatus 10 when work is being performed on the ground surface. When the preload is reached, the drive wheels 1610 of the apparatus 10 are activated so that the drive forces are distributed between the leading vehicle 2000 and the apparatus 10.

Figure 4B:
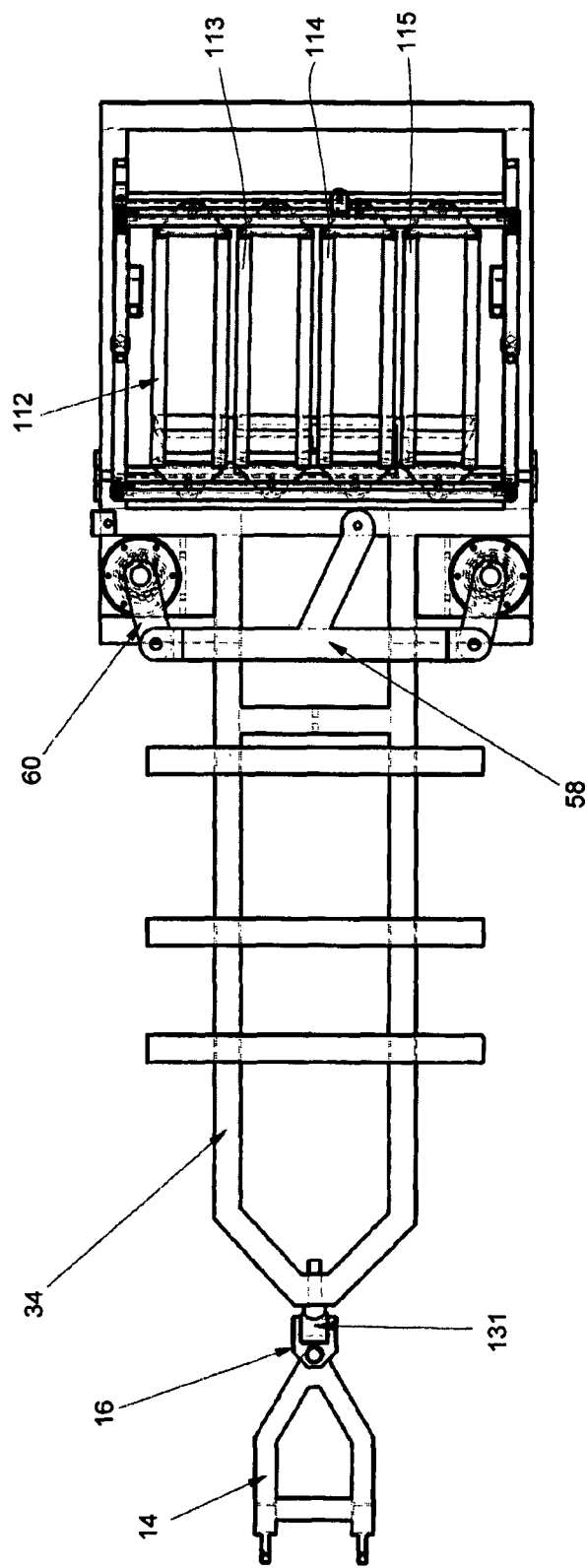
FIG. 4B illustrates a plan view of the vehicle shown in FIG. 4A.

The apparatus 10 further includes a carriage assembly 70. The carriage assembly 70 can be removably mounted to the apparatus 10 and thus can be provided as a standalone device. The carriage assembly 70 is illustrated in FIGS. 4A and 4B and details of various components thereof are illustrated in FIGS. 5 to 12. The carriage assembly 70 comprises a base section 72 which is mountable to the seeding apparatus 10 and is in the form of a frame 74 which includes side members 77 and 78 and cross members 79 and 80 (see FIG. 6). The frame 74 is hingedly mounted to chassis 12 of the apparatus 10 at hinge points 75 and 76 via pivot pins 81 and 82 and hinge brackets 83 and 84. The arrangement is such that the base section 72 can move between a position in which it is disposed in a substantially parallel plane to that of the chassis 12, as shown for example in FIG. 16, and a raised inclined position as shown for example in FIG. 4A. Guides 85 assist in guiding the movement of the base section 72 between inclined and lowered positions. An actuator 87 in the form of a hydraulic piston/cylinder 87 (FIG. 3) is operatively connected between the chassis 12 and a connector bracket 86 (FIGS. 3 and 6) to cause movement of the base section 72 between inclined and lowered positions.

The carriage assembly 70 further includes a support section 100 which in the form shown comprises a carrier frame 102 comprising side members 103 and 104 and cross members 105 and 106. The connection between each end of each adjacent side and cross member is a pivot connection thereby forming in effect a parallelogram linkage arrangement. The carrier frame 102 is operatively mounted to the base section 74 by pivot mountings 110 and 111. The arrangement is such that the frame 102 can move relative to the base section 72 about pivot mountings 110 and 111. An actuator 140 in the form of a piston/cylinder arrangement is adapted to cause the pivotal movement. The pivot mountings comprise pivot pins 120 and 121 in the side members 77 and 78 of base section 72 and apertures 122 and 123 in side members 103 and 104 of support section 100, the pins 120, 121 being received within respective apertures 122, 123. Cushioning elements 127, 128 are provided on pivot pins 120 and 121.

The support section 100 further includes mounting structures 112, 113, 114 and 115 (see FIG. 7) in the form of frames which are pivotally mounted at each end to the carrier frame 102. Each mounting structure 116 is capable of having mounted thereto a tool unit 200 having a tool head 208. A number of different types of tool units can be adapted for use with the carriage assembly which will be outlined later in this description. However, referring specifically to FIGS. 13A and 13B, the tool unit 200 can be provided in the form of a seeder unit 200 wherein the tool head 208 is a seed deposition outlet 208.

Preferably, each mounting structure 116 of the support section 100 is configured to have mounted thereto a seeder unit 200, such that a plurality of seeder units 200 are removably mounted to the carriage assembly 70. Each seeder unit 200 may take many forms. The seeder unit 200 generally includes a seed deposition outlet 208 for depositing seed. In one arrangement, as shown for example in FIGS. 13A and 13B, typically comprises a body 202, a furrow forming plough 204 with a ground engaging tip 205 having a fertilizer supply tube 206 associated therewith, a seeding plough 208 having a seed supply tube 209 associated therewith and a press wheel 210. In this specific arrangement, seed slides down the surface of the seeding plough 208 from the seed supply tube 209. Therefore, the seed deposition outlet 208 in this specific configuration is the position of the seeding plough 208. It will be appreciated that many other seeder units can be used which have alternate configurations.

Figure 13A:
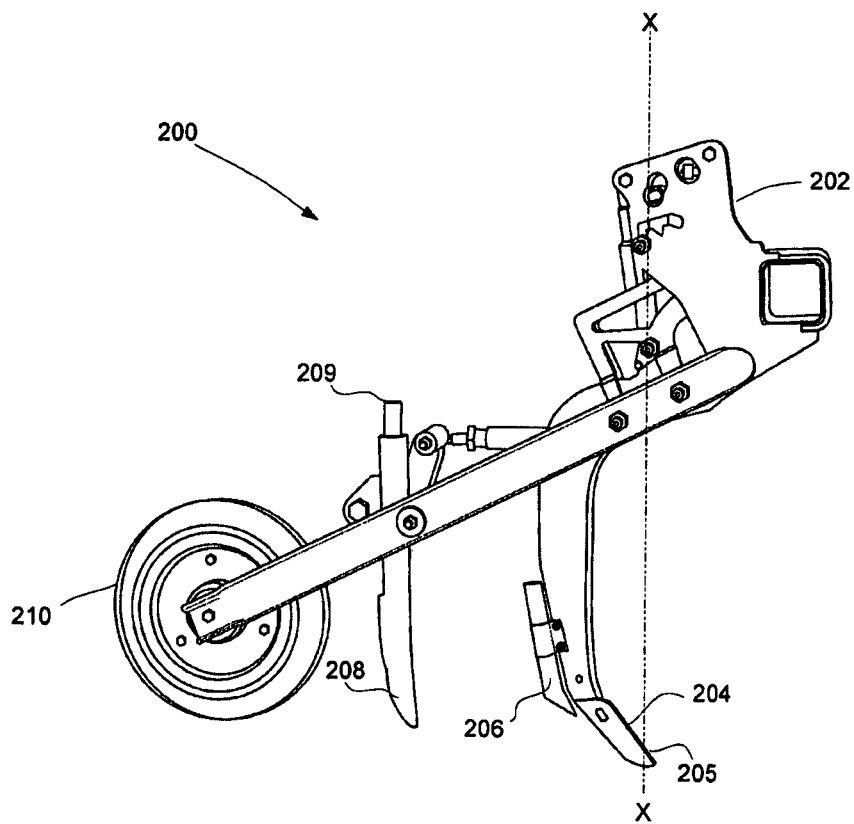
FIG. 13A illustrates a schematic side elevation of a seeder unit which is suitable for use with the vehicle shown.
Figure 13B:
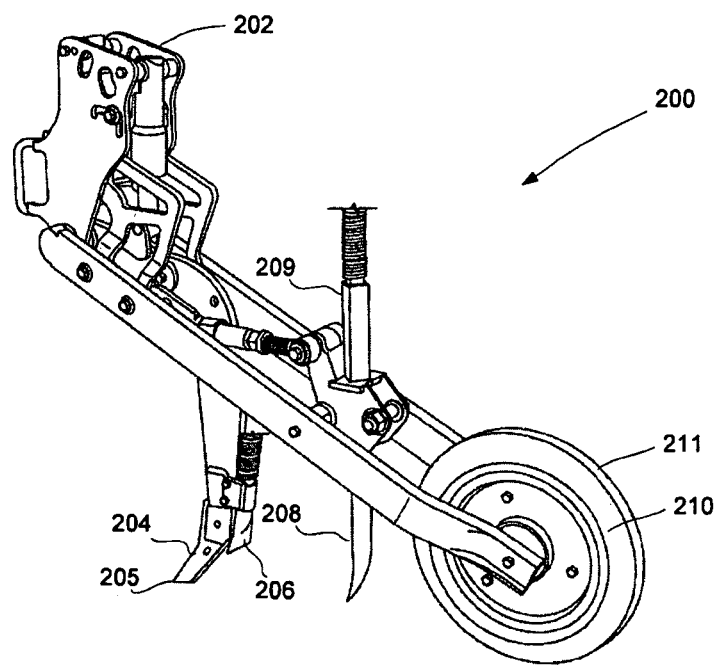
FIG. 13B illustrates a schematic rear perspective view of the seeder unit of FIG. 13A.

Whilst in FIGS. 2 and 3 the wheels of the seeder units 200 and furrow forming ploughs 204 are only shown for clarity, the wheels 210 of this seeder unit 200 shown in FIGS. 13A and 13B are provided in the form of a press wheel having a tapered ground engaging surface 211 in order to assist with seed plantation. Furthermore, it will be appreciated that many different types of units 200 can be used in combination with the tool carriage assembly 70, wherein as shown in FIGS. 2 and 3 the tool units 200 include multiple furrow forming elements. Tool units 200 of this type are known and it is not the intention to describe them or their mode of operation in any further detail.

The tool units 200 are adapted to be mounted to respective mounting structures 116. The arrangement is such that adjustment of the position of the seed deposition outlet 208 relative to the main body 12 can be effected. The units 200 are positioned on the frame 102 such that the units 200 rotate about an upright axis X-X (see FIG. 13A) which substantially passes through the tip 205 of the furrow forming plough 204 and a line Y-Y extending between the pivot mountings (see FIG. 9). It will also be appreciated that actuator 87 can be selectively controlled by the control system 1400 to adjust and set the depth which seeds are deposited in the worked ground surface.

Figure 9:
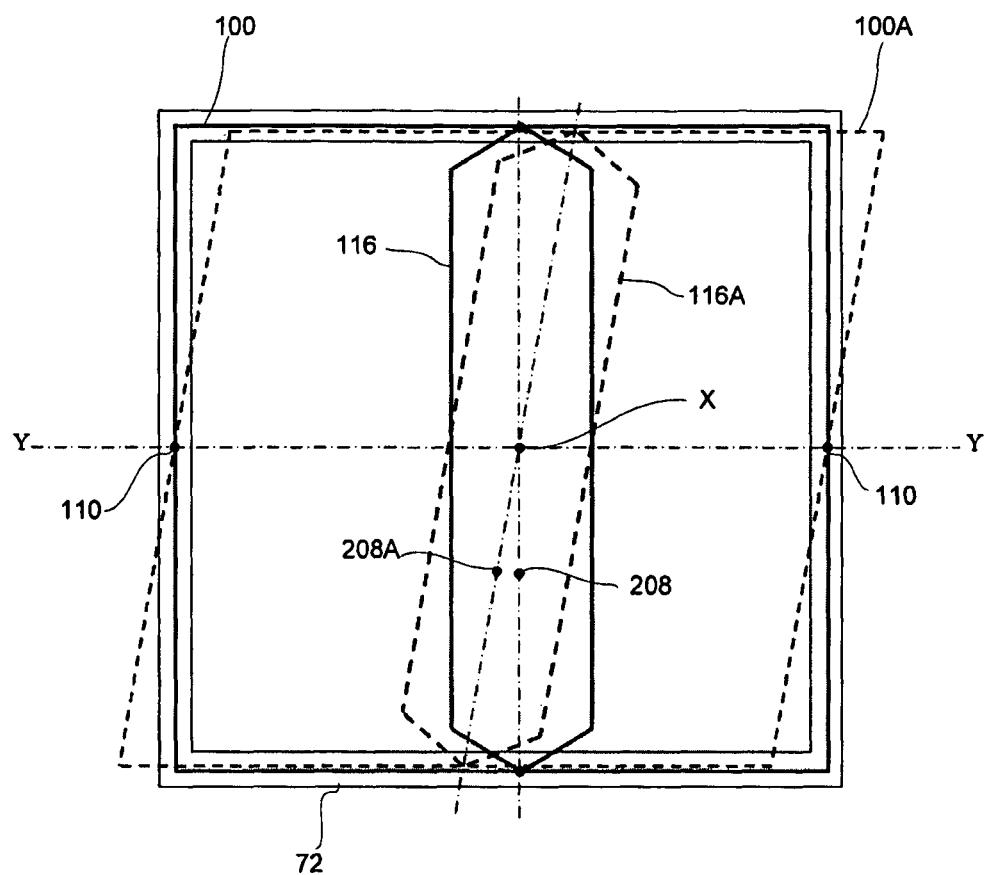
Figure 10:
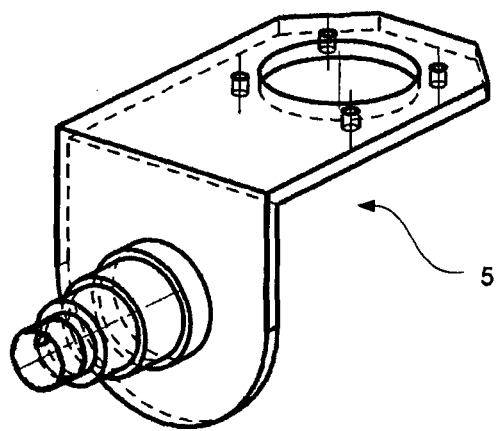
Figure 11:
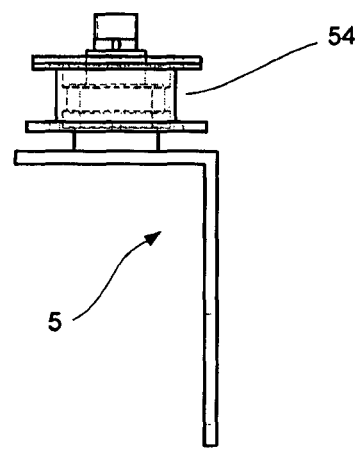
Figure 12:
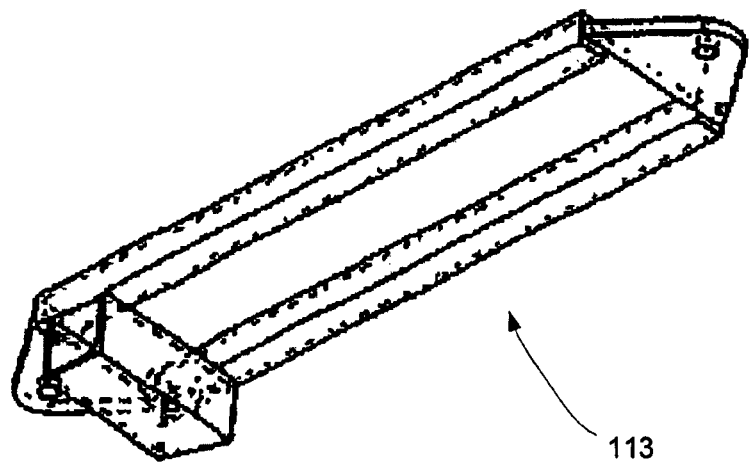

The pivotal movement of the support section 100 relative to the base section 72 is schematically illustrated in FIG. 9. Only one of the support structures 116 is shown for clarity. Furthermore, due to the movement of the particular structures in FIG. 9, duplicate features shown in phantom line have an 'A' appended to the respective reference number for clarity. The seeder unit 200 is mounted to the support structure but this is not shown in FIG. 9 for the purposes of clarity. Activation of piston/cylinder 140 by the control system 1400, as will be discussed in further detail later, causes support section 100 to pivot about pivot mountings 110 and 111 so that it can adopt the position shown in phantom line in FIG. 9 and indicated by reference number 100A. The position of the seed deposition outlet 208 after the pivoting movement is shown in phantom line and indicated by reference number 208A. This movement will cause a displacement of seed deposition outlet 208A relative to the base section 72 of the carriage assembly 70. As can also be seen in FIG. 9, the support structure has pivoted as shown by reference number 116A. The axis X which the pivoting movement rotates thereabout is shown in FIG. 13A.

Referring to FIG. 14 there is shown a block diagram representing an example of a system using the apparatus 10 described above. In particular, the system includes a control system 1400 and the vehicle 10 coupled to the leading vehicle 2000.

In this example, the leading vehicle 2000 preferably has the control system 1400 mounted thereto. The control system 1400 includes a controller 1410 in communication with one or more sensors. However, as will be discussed with reference to FIGS. 18 and 19, a system can be provided which includes only a vehicle 10 in combination with a control system 1400 which does not need to be coupled to a leading vehicle 2000. In such an arrangement, the control system 1400 is generally mounted to the vehicle 10.

Figure 15:
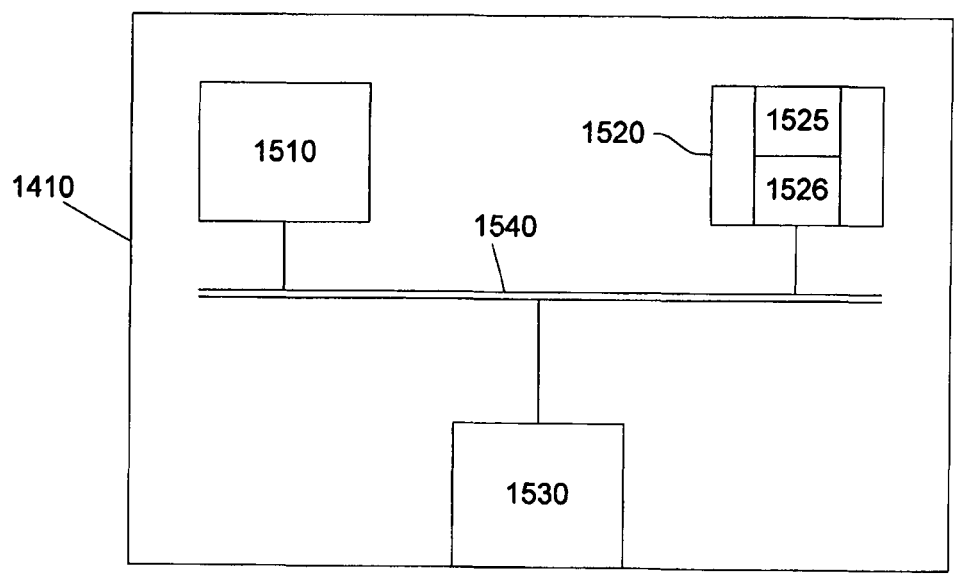
FIG. 15 illustrates a block diagram representing an example of a controller for use in the system of FIG. 14.

Referring to FIG. 15, there is shown a block diagram representing the controller 1410 of the control system 1400. In particular, the controller 1410 is formed from a processor 1510 coupled to a memory 1520, and an external interface 1530 via a bus 1540. It will be appreciated that a wide range of controllers 1410 may be used such as microprocessor, a standard generalised computer system, or alternatively a custom processing unit such as a Field Programmable Gate Array (FPGA). The external interface 1530 of the controller 1410 can be electrically coupled to the one or more sensors as well as one or more other electronically controllable units as will be described in more detail below. The memory 1520 can include volatile and non-volatile memory.

Referring back to FIG. 14, the controller 1410 of the control system 1400 is electrically coupled to a valve block 1480 mounted upon the apparatus 10. The valve block 1480 includes a plurality of valves (1497a, 1497b, 1497c, 1497d, collectively referred to by reference number 1497) which are in fluid communication with a fluid reservoir 1494 and one or more hydraulically controllable units 1490, 87, 140, 62 of the apparatus 10. The valve block 1480 is electrically controllable and includes an electrical interface 1496 which receives one or more electrical control signals from the processor 1510 of the controller 1410 via the external interface 1530 and mechanically actuates at least some of the one or more valves 1497 to hydraulically control at least one of the drive wheels 1610 (i.e. drive motors 1490), the steering assembly 50 (i.e. actuator 62), an offset position of the tool head(s) 208 (i.e. actuator 140), and an inclination of the base section/seed depth deposition (i.e. actuator 87).

One or more amplifier units 1470 can be located between the controller 1410 of the control system 1400 and the electrical interface 1496 of the valve block 1480 to amplify and/or adjust one or more signals transferred therebetween to an appropriate level.

When the apparatus 10 is releasably attached to the leading vehicle 2000 via the coupling hitch 16, an electrical cable 1495 is connected between the external interface 1530 of the controller 1410, the amplifiers 1470, and sensors 1401, 621, 871 and 130.

The controller 1410 is also in electrical communication with a number of electronic devices mounted to the leading vehicle 2000 including at least one of a leading vehicle position detection sensor 1420, a leading vehicle orientation detection sensor 1430, an angular displacement sensor 1440, a speedometer 2020 of the leading vehicle 2000 and a leading vehicle control system including velocity control system 1450 and a steering control system 2011 of the leading vehicle 2000.

As shown in FIG. 14, the leading vehicle position detection sensor 1420 and the leading vehicle orientation detection sensor 1430 can be provided in the form of a pair of GPS sensors, wherein the processor 1510 of the controller 1410 can perform data processing upon data received from the pair of GPS sensors to determine the position and orientation of the leading vehicle 2000 accordingly. However, it will be appreciated that a dedicated leading vehicle position detection sensor 1420 and a dedicated leading vehicle orientation detection sensor 1430 can be utilised in an alternative configuration.

The controller 1410 is in electrical communication with the angular displacement sensor 1440 which is configured to sense the angular displacement between the leading vehicle 2000 and the apparatus 10. In a preferred embodiment, the angular displacement sensor 1440 is provided in the form of a potentiometer provided at the coupling hitch 16 or alternatively at the complementary coupling of the leading vehicle 2000. The potentiometer 1440 is an angular displacement potentiometer configured to sense an angular displacement between the leading vehicle 2000 and the apparatus 10. The angular displacement potentiometer 1440 transfers a signal to the controller 1410 indicative of the angular displacement between the leading vehicle 2000 and the vehicle 10.

It will be appreciated that a number of alternate configurations could be used as a substitute for the angular displacement potentiometer 1440. In one configuration, the angular displacement sensor 1440 could be provided as a laser rangefinder configured to determine an angular displacement between a predefined point on the apparatus 10 and the laser rangefinder. In a specific form, the predefined point is a marker on the apparatus 10, such as a piece of reflective tape located on the exhaust pipe of the engine of the apparatus 10.

The controller 1410 can also be in electrical communication with a number of sensors mounted on the vehicle 10. In particular, the force sensor 130 is schematically shown in FIG. 14 as being mounted at the vehicle 10 (specifically at the coupling hitch 16) which generates and transfers a force signal to the controller 1410 via the external interface 1530. However, it will be appreciated that the force sensor 130 may alternatively be provided at a complementary receiving coupling of the leading vehicle 2000 which couples to the coupling hitch of the vehicle 10 such that the force sensor 130 is alternatively mounted on the leading vehicle 2000.

In addition, the external interface 1530 of the controller 1410 is in electrical communication with one or more position sensors 871, 1401, 621 which generate and transfer one or more electrical signals to the controller 1410 indicative of the position of the respective hydraulic actuators 87, 140, 62. In the specific embodiment where the hydraulic actuators 87, 140, 62 are provided in the form of a piston and cylinder arrangement, each position sensor 871, 1401, 621 senses the position of the piston with respect to the cylinder. Position sensor 1401 generates a signal indicative of an offset position of the tool head(s) 200.

The memory 1520 of the controller 1410 has stored therein intended travel path data 1525. In instances where seed deposition is occurring in a straight line, the intended travel path data 1525 is indicative of a single intended travel path. However, in some instances where seed deposition is to occur in a non-straight line, such as a curve, the intended travel path data 1525 may be indicative of an intended travel path of the vehicle 10 and an intended travel path of the tool head(s) 208. Specifically, the tool head(s) 208 of the tool unit(s) 200 may be required to travel a different path to that of the vehicle 10. For example, this can occur when the vehicle 10 is to travel along a curved path. During periods of travel where different intended travel paths are being used as a reference for the vehicle 10 and the tool head(s) 208, the controller 1410 can calculate a first displacement error for the vehicle 10 and a second displacement error for the tool head(s) 208.

The controller 1410 is configured to determine, based upon the position of the leading vehicle 2000, the orientation of the leading vehicle 2000, the angular displacement between the leading vehicle 2000 and the apparatus 10, and the position of one or more of the actuators 87, 140, 62, whether the apparatus 10 and tool head(s) have deviated from the intended travel path indicated by the intended travel path data 1525 stored in memory of the controller 1410. The deviation is calculated by the controller 1410 as a displacement error of the vehicle relative to the intended travel path and a displacement error of the tool head(s) relative to the intended travel path. In a particular manner, the displacement errors are a lateral displacement error. The displacement error of vehicle relative to the intended travel path comprises of multiple components including an angular displacement error of the vehicle and a linear displacement error of the vehicle relative to the intended travel path. The displacement error of the tool head(s) 208 is generally a linear displacement error of the tool head(s) 208 relative to the intended travel path. The controller 1410 is configured to determine, on a periodic basis, a displacement error relative to the intended travel path. As discussed with reference to FIGS. 17 and 19, the controller 1410 may be configured to determine the displacement error in constant loop which can be performed approximately every 50 milliseconds. However, it will be appreciated that the period can be adjusted for the specific application.

In the event that the controller 1410 determines that the apparatus 10 has deviated from the intended travel path (i.e. the controller 1410 determines a non-zero displacement error), the controller 1410 can generate one or more electronic control signals which are received by the valve block 1480 to hydraulically control the actuation of the hydraulic actuator 140 accordingly to substantially correct the displacement error of the vehicle 10 toward the intended travel path. In preferable embodiments, the adjustments made seek to eliminate the displacement error of the vehicle relative to the intended travel path.

More specifically, the controller 1410 can transfer an electronic control signal to actuate and adjust the hydraulic actuator 140, thereby causing the support section 100 to distort, as shown in FIG. 9, thereby resulting in linear movement of the seed deposition outlet 208. Thus, despite the body of seeder unit 200 deviating from the intended travel path due to the distortion of the support section 100, the location of seed deposition outlet 208 can be precisely adjusted so that the seeds are deposited substantially near or exactly on the intended travel path.

As the controller 1410 adjusts the actuation of the actuator 140, the controller 1410 can store, in memory 1520, data indicative of the position of the piston of the actuator 140 as this data may be used for future calculations by the controller 1410 to determine if further linear correction of the tool carriage assembly 70 is required via distortion of the support section 100. Whilst the specific embodiment of distorting the support section 100 has been described above, it will be appreciated that other means could be provided to linearly displace the seed deposition outlet 208.

In response to determining the displacement error of the vehicle 10, the controller 1410 can additionally or alternatively actuate and adjust, via the valve block 1480, the hydraulic actuator 62 to adjust the steering of the wheels 1610 such that the angular displacement of the vehicle 10 is substantially corrected toward the intended travel path. In preferable embodiments, the adjustments made seek to eliminate the displacement error regarding the angular displacement of the vehicle 10 relative to the intended travel path. As the controller 1410 adjusts the actuation of the actuator 62, the controller 1410 can store, in memory 1520, data indicative of the position of the piston of the actuator 62 as this data may be used for future calculations by the controller 1410.

Additionally or alternatively, in response to determining the displacement error of the vehicle 10 relative to the intended travel path, the controller 1410 can actuate and adjust, via the valve block 1480, the power provided to the drive wheels 1610 of the vehicle 10. By adjusting the direction of alignment of the wheels and the power provided to the drive wheels, the linear displacement and angular displacement of the apparatus 10 and the seed deposition outlet 208 can be substantially corrected toward the intended travel path. In preferable embodiments, the adjustments made seek to eliminate the linear displacement and angular displacement of the apparatus 10 and the seed deposition outlet 208 relative to the intended travel path. As the controller 1410 adjusts the actuation of the power unit 1493, the controller 1410 can store, in memory 1520, data indicative of power delivered to the power unit as this data may be used for future calculations by the controller 1410.

Figure 17:
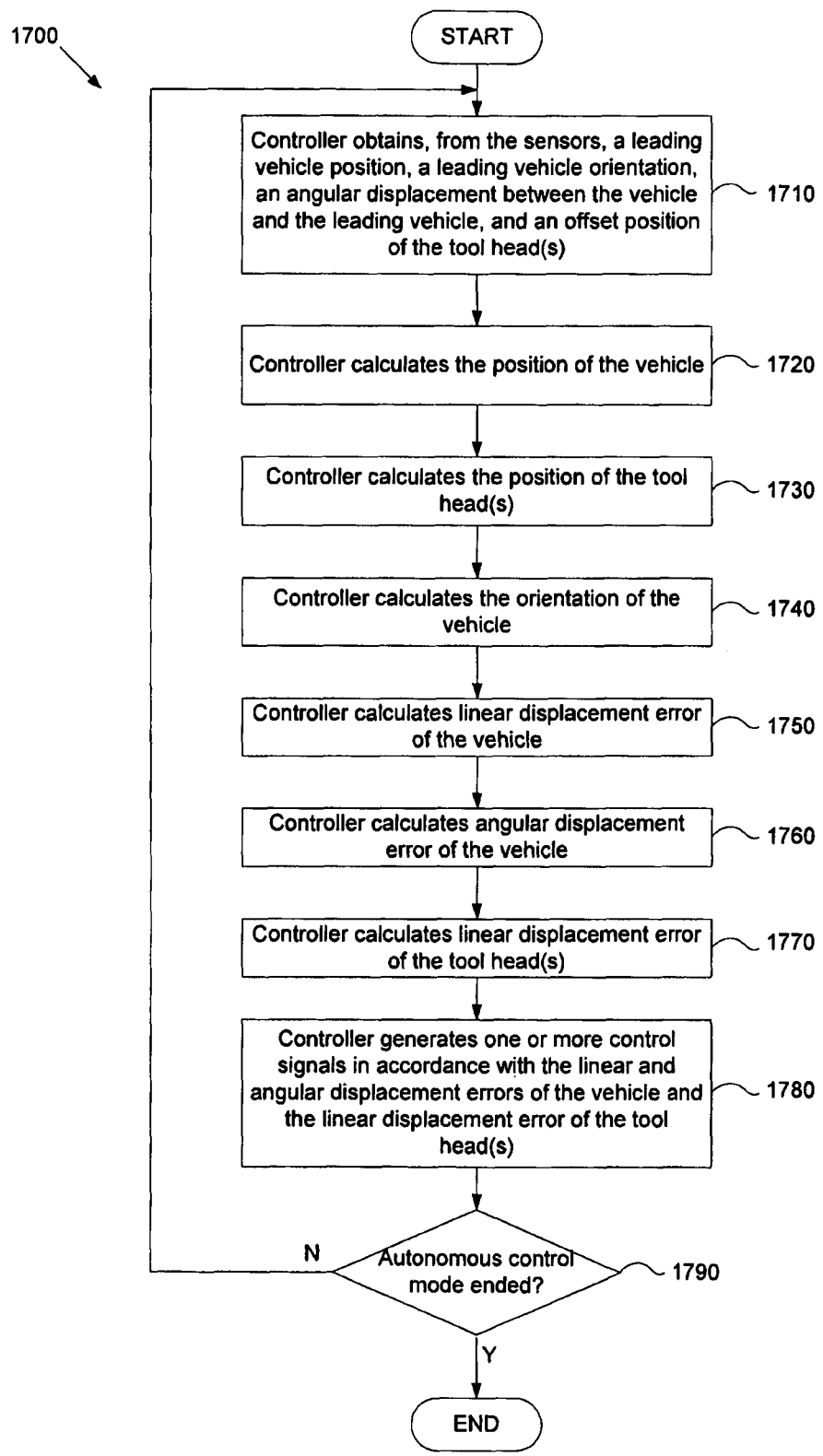
FIG. 17 illustrates a flowchart representing a method performed by a controller of a control system of FIG. 14 to determine a displacement error.

Referring to FIG. 17 there is shown a flowchart representing a method 1700 performed by the controller 1410 of the control system 1400. The controller 1410 has stored in memory 1520 a set of computer executable instructions 1526 which configure the controller 1410 to perform the method 1700. In particular, the control system 1400 is configured to autonomously control (i.e. without human input) correction of the travel path of the vehicle 10 (coarse adjustment) and tool head(s) 208 (fine adjustment). In preferable embodiments, the control system autonomously seeks to eliminate the displacement of the apparatus 10 and the tool head(s) 208 relative to the intended travel path.

At step 1710, the method 1700 includes the processor 1510 of the controller 1410 obtaining, from sensors of the control system 1400, the leading vehicle position, the leading vehicle orientation, the angular displacement between the vehicle 10 and the leading vehicle 2000, and an offset position of the tool head(s) 208. In particular, the controller 1410 receives signals from sensors 1420, 1430, 1440, 1401 which are indicative of the leading vehicle leading vehicle position, the leading vehicle orientation, the angular displacement between the vehicle 10 and the leading vehicle 2000, and a current position of actuator 140 which is indicative of the positional offset of the tool head(s) 208 relative to the base section 72. In one form, these values may be stored in memory 1520 by the processor 1510 of the controller 1410 on a periodic basis and may be retrieved from memory 1520 by the processor 1510 when determining the displacement error for the vehicle and the tool head(s) relative to the intended travel path. However, it is possible for the controller 1410 to obtain at least some of these values in real time from at least some of the sensors 1420, 1430, 1440, 1401.

At step 1720, the method 1700 includes the processor 1510 of the controller 1410 calculating the current position of the vehicle 10 based upon the leading vehicle position, the leading vehicle orientation, the angular displacement between the vehicle 10 and the leading vehicle 2000. In particular, the controller 1410 has stored in memory a set of executable instructions 1526 which are executed by the processor 1510 to apply one or more mathematical functions using the above values as inputs to determine an output value indicative of the current position of the vehicle 10.

At step 1730, the method 1700 includes the processor 1510 of the controller 1410 calculating the position of the tool head(s) 208 using the position of the vehicle, the orientation of the vehicle, and the offset position of the tool head(s) 208. In preferable configurations where multiple tool units 200 are mounted to the vehicle 10, the tool heads 208 of the tool units 200 are equally spaced on the carriage assembly 70. Thus, the processor 1510 of the controller 1410 only need calculate the working position of one of the tool heads 208. In the instance that the tool unit(s) 200 are seeder unit(s), the controller 1410 calculates the current position of the seed deposition outlet 208 of the seeder unit(s) 200.

At step 1740, the method 1700 includes the processor 1510 of the controller 1410 calculating the orientation of the vehicle 10 using the orientation of the leading vehicle 2000 and the angular displacement between the vehicle 10 and the leading vehicle 2000. Specifically, the orientation of the leading vehicle 2000 is adjusted by the processor 1510 of the controller 1410 according to the angular displacement to calculate the orientation of the vehicle 10.

Steps 1750 to 1770 include the processor 1510 of the controller 1410 determining a displacement error relative to the intended travel path for the vehicle 10 and the tool head(s) 208. The displacement error for the vehicle 10 can include two error components, specifically a linear displacement error and an angular displacement error of the vehicle 10 relative to the intended travel path. The displacement error for the tool head(s) 208 is a linear displacement error relative to the intended travel path.

At step 1750, the method 1700 includes the processor 1510 of the controller 1410 calculating the linear displacement error of the vehicle 10 relative to the intended travel path using the position of the vehicle, the orientation of the vehicle and the intended travel path data 1525. The controller 1410 has stored in memory a set of executable instructions 1526 which are executed by the processor 1510 to apply one or more mathematical functions to calculate a linear displacement error of the vehicle 10 using the position of the vehicle, the orientation of the vehicle and the intended travel path data 1525 stored in memory.

At step 1760, the method 1700 includes the processor 1510 of the controller 1410 calculating the angular displacement error of the vehicle 10 relative to the intended travel path using the current orientation of the vehicle 10 and the intended travel path data 1525. The controller 1410 has stored in memory a set of executable instructions 1526 which are executed by the processor 1510 to apply one or more mathematical functions to calculate the angular displacement error of the vehicle 10 relative to the intended travel path using the current orientation of the vehicle 10 and the intended travel path data 1525 stored in memory.

At step 1770, the method 1700 includes the processor 1510 of the controller 1410 calculating the linear displacement error of the tool head(s) 208 relative to the intended travel path using the position of the tool head(s) and the intended travel path data 1525. The controller 1410 has stored in memory a set of executable instructions 1526 which are executed by the processor 1510 to apply one or more mathematical functions to calculate the linear displacement error of the tool head(s) 208 relative to the intended travel path using the position of the tool head(s) and the intended travel path data 1525.

At step 1780, the method 1700 includes the processor 1510 of the controller 1410 generating one or more control signals in accordance with the linear and the angular displacement error of the vehicle and the linear displacement error of the tool head(s) 208 to control at least one of the steering assembly 50 of the vehicle 10, power provided to the drive wheels 1610 of the vehicle 10, and the offset position of the tool unit(s) 200. In particular, the one or more control signals are transferred via the external interface 1530 and the electrical cable 1495 to the electrical interface 1496 of the valve block 1480.

In the event that one of the control signals is indicative of adjusting the steering assembly 50 of the vehicle 10, the valve block controls valve 1497c to adjust the hydraulic pressure provided to hydraulic actuator 62 in accordance with the respective control signal.

In the event that one of the control signals is indicative of adjusting the power provided to the drive wheels 1610 of the vehicle 10, the valve block controls valve 1497a to adjust the hydraulic pressure provided to the hydraulic drive motors 1490 in accordance with the respective control signal. As the hydraulic drive motors 1490 are preferably connected in a parallel arrangement, the same hydraulic pressure is provided to each of the drive motors 1490 although the respective drive wheels 1610 may rotate at different speeds.

In the event that one of the control signals is indicative of adjusting the offset position of the tool unit(s) 200, the valve, block controls valve 1497d to adjust the hydraulic pressure provided to hydraulic actuator 140 in accordance with the respective control signal. As the piston of the hydraulic actuator 140 moves relative to the respective cylinder, the distortion of the support section 100 is adjusted, thereby causing the tool heads(s) 208 to linearly displace. In the specific example of seeding units 200, the seeder units 200 pivot about the respective ground engaging tips 205 such that the seed deposition outlet 208 of the seeder units 200 is linearly displaced.

At step 1790, the processor 1510 of the controller 1410 determines whether an autonomous control mode of the controller 1410 has ended. In particular, as will be explained later, a user may select whether the control system 1400 is to operate in an autonomous mode. The processor 1510 of the controller 1410 may check a value stored in memory 1520 to determine if the control system 1400 is to continue operating in the autonomous mode. Alternatively, an interrupt control process may be used. In the event that the control system 1400 is to continue to operate in the autonomous mode, the method 1700 proceeds back to step 1710. In the event that the control system 1400 is not to operate in the autonomous mode, the method 1700 ends. Steps 1710 through to 1790 may be repeated in a loop and on a periodic basis. In a preferred embodiment, the displacement error is calculated approximately every 50 ms, although this frequency can be adjusted for the specific application.

The leading vehicle 2000 may additionally include a leading vehicle control system 1455 including velocity control system 1450 and a steering control system 2011 of the leading vehicle, each of which are in communication with the controller 1410.

The velocity control system 1450 of the leading vehicle 2000 can be controlled by the controller 1410 in order to maintain an intended velocity of the leading vehicle 2000. The controller 1410 can determine a velocity of the leading vehicle 2000 by fusing a GPS calculated velocity of the leading vehicle with a velocity indicated by a velocity sensor of the leading vehicle such as a speedometer 2020. The GPS calculated velocity is calculated by the controller 1410 using the GPS coordinates received from the GPS sensors 1425. The fusion of the velocities is performed by the controller 1410 due to the speedometer 2020 being a function of the wheel rotation however the wheels may spin or slip, thus correction is required via the GPS data. The controller 1410 has stored in memory 1520 an intended velocity value, or value(s), which the leading vehicle 2000 is to maintain. The controller 1410 can perform a comparison between the determined velocity of the leading vehicle 2000 and the intended velocity value stored in memory to determine a velocity error. The controller 1410 then generates a control signal based on the velocity error to electronically actuate the velocity control system 1450 such that the leading vehicle drive unit 2010 is actuated accordingly to correct the velocity of the leading vehicle 2000. This process can be performed periodically similar to that described above for controlling the vehicle 10.

The steering control system 1450 of the leading vehicle 2000 can be controlled by the controller 1410 in order to maintain the leading vehicle 2000 on an intended travel path for the leading vehicle. In particular, the memory 1520 has stored intended travel path data of the leading vehicle 2000. The GPS data received from the GPS sensors 1425 can be used by the controller 1410 in a comparison against the intended travel path data of the leading vehicle 2000 to determine a displacement error of the leading vehicle 2000 relative to the intended travel path data of the leading vehicle 2000. The controller 1410 then generates a control signal based on the displacement error of the leading vehicle 2000 to electronically actuate the steering control system 2011 of the leading vehicle such that the direction of the wheels of the leading vehicle are corrected. This process can be performed periodically similar to that described above for controlling the vehicle 10.

As shown in FIG. 14, the controller 1410 can be in electrical communication with a manual control unit 1415. In particular, the manual control unit 1415 includes one or more input elements such as dials and buttons. The manual control unit 1415 allows a user to selectively control one or more of the hydraulic units 87, 62, 140, 1493 according to input received from user interaction with the input elements of manual control unit 1415. Preferably, the actuation of the actuator 87 is performed based upon user input received via the manual control unit 1415. Whilst actuation of hydraulic units 1493, 140 and 62 are generally controlled autonomously by the control system 1400, the user may wish to selectively control these units 1493, 140 and 62 via the interaction with the input elements of the manual control unit 1415.

The manual control unit 1415 can additionally allow the user to select, via interaction with one or more of the input elements of the manual control unit 1415, a mode of operation of the leading vehicle 2000. In particular, the operation of the leading vehicle 2000 can be controlled by the controller 1410 in an autonomous mode. Specifically, as discussed above, the controller 1410 can control the leading vehicle control system 1455 in order to autonomously control the leading vehicle 2000.

The user can also select, via interaction with the manual control unit 1415, a remote control mode for the operation of the leading vehicle 2000, wherein a remote control unit can be used by the user to control the operation of the leading vehicle 2000. The remote control unit transfers data to the leading vehicle control system 1455, which in turn controls the leading vehicle 2000. The remote control unit may be part of the manual control unit 1415 or may alternatively be a separate unit.

The user can also select a manual mode, wherein a user can then operate the leading vehicle 2000 manually using the normal controls (brake, accelerator, steering wheel, etc).

As discussed earlier, the force sensor 130 is in electrical communication with the controller 1410 to provide an electrical signal indicative of the force at the hitch point between the leading vehicle 2000 and the apparatus 10. The force sensor 130 is pre-tensioned to a predefined value, such as 5,000 N. Thus, the controller 1410 of the control system 1400 receives at rest a signal indicative of 5,000 N. When the leading vehicle 2000 begins to pull, the tension increases. The controller 1410 can be configured to transfer an electrical signal to actuate the drive units 1490 of the wheels once the sensed force exceeds a first threshold. In this example, the threshold may be set in memory of the controller as 1,000 N greater than the force at rest. Thus, the controller 1410 can begin to transfer an electrical signal to actuate the drive units 1490 of the wheels when the sensed force reaches or exceeds 6,000 N. When the leading vehicle 2000 begins to slow or stop, the sensed force transferred to the controller decreases to the point where the force sensed is less than at rest. When the force sensed is equal to or less than a second threshold less than the force at rest, the controller ceases actuating the drive units 1490 associated with the wheels. In this particular example, the second threshold may be 1,000 N less than the force at rest, or approximately 4,000 N. As will be appreciated, there is a 'dead zone' between the first and second thresholds.

In an optional form, the control system 1400 can be in electrical communication with a three dimensional scanning system 1499. The three dimensional scanning system 1499 can include one or more laser range finders to scan the surroundings of the leading vehicle 2000 and apparatus 10. The controller 1410 can perform data analysis upon three dimensional data to detect obstacles, wherein upon detection, the operation of the leading vehicle 2000 and the apparatus 10 is temporarily interrupted until the obstacle is no longer detected, wherein the leading vehicle and apparatus are automatically re-enabled to operate once again.

Whilst the position detection sensor 1420 has been discussed in a preferred embodiment as being provided as a GPS sensor, other arrangements can be used which can provide higher accuracy. For example, a ground based position detection system can be installed upon the land which the leading vehicle and the apparatus are to be operated upon. The ground based location system can include a plurality of local beacons and laser generating units to provide an accurate position of the leading vehicle and/or apparatus upon the land. Location data generated by the ground based position detection system can be transferred to the control system mounted upon the leading vehicle which can be used to control the operation of the apparatus accordingly.

The provision of a vehicle having self-powered steerable drive wheels facilitates a coarse lateral position adjustment of the vehicle in order to compensate for forces causing the vehicle to move off the intended travel path. The provision of a carriage assembly associated with the vehicle facilitates a fine lateral position adjustment which in effect can be superimposed on the coarse lateral position adjustment. In the particular application of a seeding apparatus this enables highly accurate locating of the seeds during a seeding operation. For example the seeding point can be adjusted to within ±2 cm of the intended seeding point whilst the vehicle adjustment can be adjusted within ±5 cm. Furthermore, the arrangement enables the use of smaller towing vehicles such as compact tractors. Prior art systems which use a large towing vehicle to tow a plurality of agricultural units, such as seeder units, generally cause approximately 20% to 30% of the tract of land being unusable for agriculture due to ground compaction by the large towing, vehicle. In the case of agricultural applications, the above-described arrangement results in reduced ground compaction due to the distributed motor arrangement. The arrangement is also suitable for autonomous operation of both the towed vehicle and the towing vehicle which is particularly advantageous as human operated systems cannot achieve the required accuracies for substantial periods of time.

In the particular embodiment described with reference to FIGS. 1 to 18, the vehicle 10 shown is adapted to be attached to a leading vehicle 2000. The leading vehicle 2000 can be a towing vehicle. However, as has been made clear, the vehicle could be adapted for use by itself rather than require a leading vehicle 2000. Additional ground engaging wheels may be required to provide additional stability for such an arrangement. The control system 1400 can be carried upon the vehicle 10. An example system for a standalone vehicle which does not require a leading vehicle will now be discussed with reference to FIGS. 18 and 19.

Figure 18:
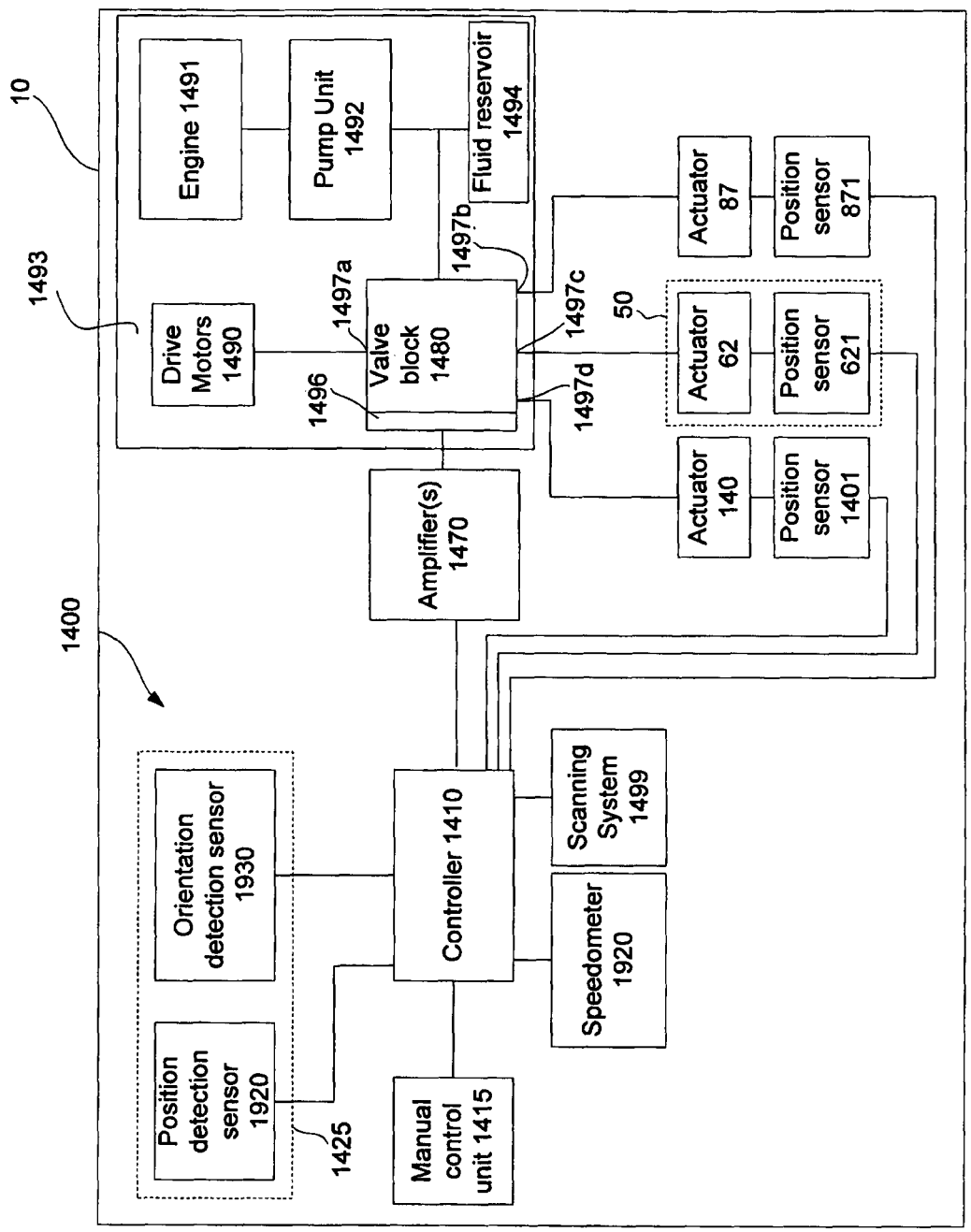
FIG. 18 illustrates a functional block diagram representing an example of a system including a control system and a vehicle.
Figure 19:
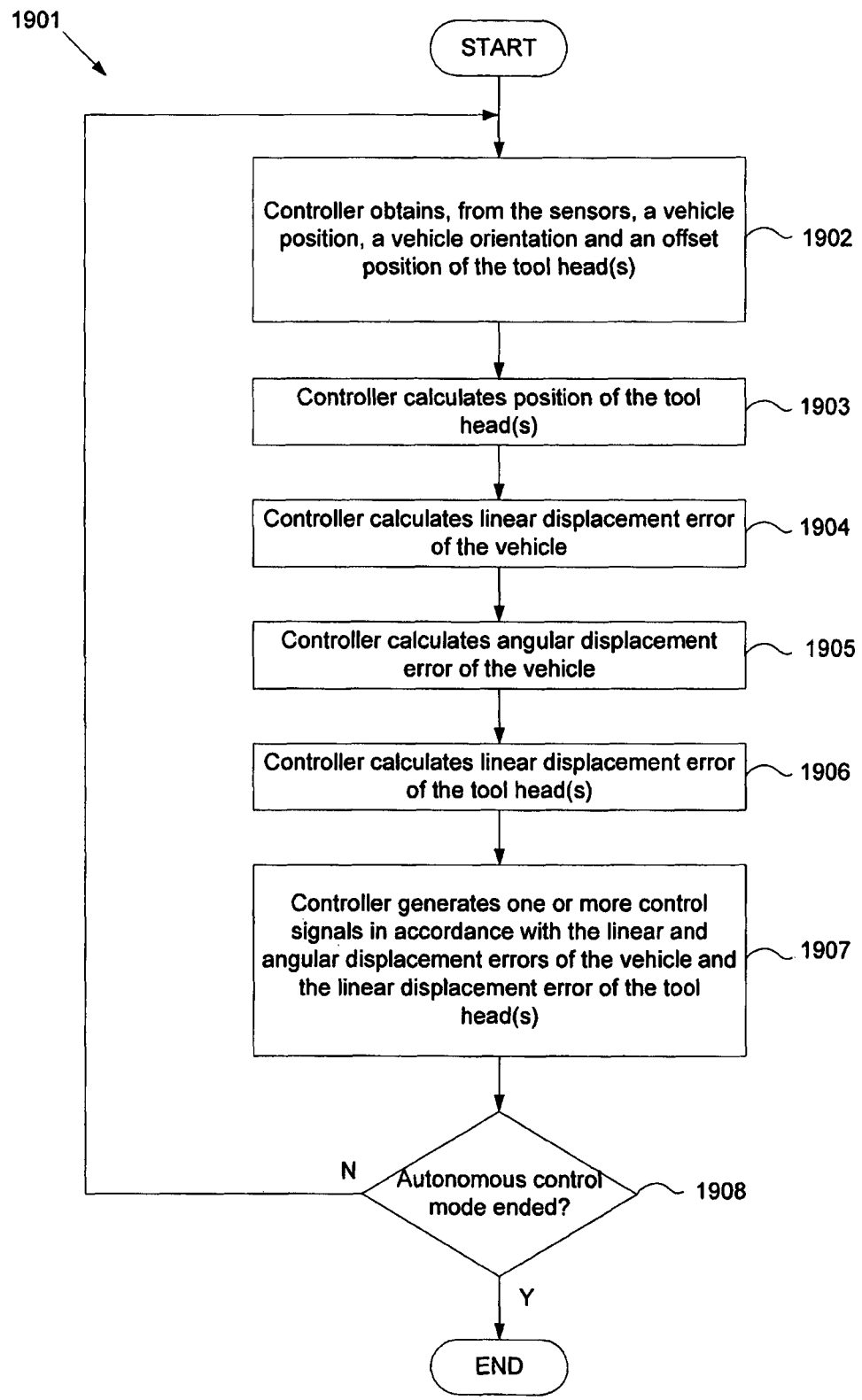
FIG. 19 illustrates a flowchart representing a method performed by the controller of a control system of FIG. 18 to determine a displacement error.

In particular, the system of FIG. 18 has a number of common components to that of FIG. 14. The control system 1400 includes a position detection sensor 1920 that is mounted on the vehicle 10 for detecting the position of the vehicle 10. The control system 1400 also includes an orientation detection sensor 1930 mounted on the vehicle 10 for detecting the orientation of the vehicle 10. As will be appreciated, the position detection sensor 1920 and the orientation detection sensor 1930 can be provided as a pair of GPS sensors which are mounted on the vehicle 10 as previously discussed with respect to FIG. 14.

As the position of the vehicle and the orientation of the vehicle 10 are obtained from the position detection sensor 1920 and the orientation detection sensor 1930, the method performed by the controller 1410 to calculate the displacement error is simplified compared to that discussed in relation to FIG. 17. This simplified method will now be discussed in relation to FIG. 19.

In particular the method 1901 includes at step 1902 the processor 1510 of the controller 1410 obtaining the position of the vehicle 10, the orientation of the vehicle 10, and the offset position of the tool head(s) 208. In particular, this data is obtained from the position detection sensor 1920, the orientation detection sensor 1930, and the position sensor 1401 associated with actuator 140.

At step 1903, the method 1901 includes the processor 1510 of the controller 1410 calculating the position of the tool heads(s) 208. In particular, the controller calculates the position of the tool heads(s) 208 using the position of the vehicle 10, the orientation of the vehicle 10, and the offset position of the tool(s) 208. The controller 1410 has stored in memory 1520 a set of executable instructions 1526 which are executed by the processor 1510 to apply one or more mathematical functions to calculate the position of the tool(s) using the position of the vehicle and the offset position of the tool unit(s).

Steps 1904 to 1906 are performed by the processor 1510 of the controller 1401 to calculate the displacement error of the vehicle 10 and the tool head(s) 208. As discussed above, the displacement error of the vehicle 10 relative to the intended travel path can comprise of two components, namely the linear displacement error and the angular displacement error of the vehicle relative to the intended travel path. The displacement error of the tool head(s) 208 is a linear displacement error of the tool head(s) relative to the intended travel path.

At step 1904, the method 1901 includes the processor 1510 of the controller 1410 calculating the linear displacement error of the vehicle 10. In particular, the controller 1410 has stored in memory 1520 a set of executable instructions 1526 which are executed by the processor 1510 to apply one or more mathematical functions to calculate the linear displacement error of the vehicle using the position of the vehicle 10, the orientation of the vehicle and the intended travel path data 1525 stored in memory 1520.

At step 1905, the method 1901 includes the processor 1510 of the controller 1410 calculating the angular displacement error of the vehicle 10 relative to the intended travel path. In particular, the controller 1410 has stored in memory a set of executable instructions 1526 which are executed by the processor 1510 to apply one or more mathematical functions to calculate the angular displacement error of the vehicle using the orientation of the vehicle 10 and the intended travel path data 1525 stored in memory 1520.

At step 1906, the method 1901 includes the processor 1510 of the controller 1410 calculating the linear displacement error of the tool head(s) 208 relative to the intended travel path. In particular, the controller 1410 has stored in memory a set of executable instructions 1526 which are executed by the processor 1510 to apply one or more mathematical functions to calculate the linear displacement error of the tool head(s) 208 using the position of the tool head(s) 208 and the intended travel path data 1525 stored in memory 1520.

At step 1907, the method 1901 includes the processor 1510 of the controller 1410 generating the one or more control signals according to the linear and angular displacement errors of the vehicle 10 and the linear displacement error of the tool head(s) 208. This step is performed in the same manner as step 1780.

At step 1908, the method 1901 includes the processor 1510 of the controller 1410 determining if the autonomous control mode has ended. This step is performed in the same manner as step 1790 except in response to the control system 1400 determining to continue operating in the autonomous control mode, the method 1901 proceeds back to step 1902. As discussed with relation to FIG. 17, steps 1902 to 1908 can be performed in a continuous loop, wherein each loop may be performed every 50 milliseconds, although this can be adjusted for the specific application accordingly.

Referring back to FIG. 18, the controller 1410 can be in communication with the speedometer 1920 of the vehicle 10. The controller 1410 can similarly calculate a velocity of the vehicle 10 by adjusting the speedometer velocity according to the sensed position obtained from the position detection sensor 1920. The controller 1410 can then compare the adjusted velocity against an intended velocity value stored in memory 1520 to determine a velocity error. The controller 1410 can then generate a control signal which is received by the valve block 1480 to adjust the power provided by the power unit 1493 to the drive wheels 1610 in order to attempt to maintain the vehicle 10 travelling at the intended velocity.

In one form, the memory 1520 of controller 1410 may have stored therein intended travel path data which may include one or more vectors including a plurality of GPS coordinates defining the intended travel path.

The vehicle 10, the tool carriage 70 and the system may be adapted for many applications. In one particular application, as previously discussed, aspects of the invention are suitable for use as a seeding apparatus. It is to be understood that this is not to be considered in any way a limitation on the disclosure as the vehicle may find application in other areas. Examples of other agricultural applications may include cultivators, harvesters, sprayers and mowers. The vehicle may also in certain applications be adapted to be attached to another vehicle so as to be towed. Aspects of the invention may also be used for other non-agricultural applications such as post hole digging and line painting. Other applications may be appreciated by the person skilled in the art.

It will be appreciated that whilst embodiments have been described which cause the tool head(s) 208 to pivot about the X-X axis, the displacement of the tool head(s) 208 to achieve a fine coarse correction can be achieved using other means. For example, the tool carriage assembly 70 may have mounted thereto an X-Y table mechanism which is operatively connected to the tool units 200. The X-Y table mechanism can be electronically actuated via one or more control signals generated by the controller 1410 in response to determining a displacement error of the tool head(s) relative to the intended travel path, wherein in response the X-Y table mechanism causes horizontal linear displacement of the tool head(s) 208 relative to the base section 72.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer", "above", "below", "upper" and "lower" and the like are used as words of convenience to provide reference points and are not to be construed as limiting terms.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

It will be appreciated that steps of method depicted in flowcharts can be performed in a different order than that which is depicted and may be performed simultaneously.

The invention claimed is:

1. A system including a vehicle comprising a chassis having a forward and a rearward end, a traction drive comprising at least two drive wheels operatively mounted to the chassis for causing propulsion of the vehicle, a steering assembly for facilitating steering of the drive wheels when in an operating mode; a leading vehicle connected to the vehicle by a coupling assembly; a force sensor for sensing a force applied at the coupling assembly between the vehicle and the leading vehicle, and a controller; wherein in response to a displacement error of the vehicle relative to an intended travel path, the drive wheels and steering assembly are responsive to one or more control signals generated in accordance with the force sensed by the force sensor and the displacement error to substantially correct the displacement error of the vehicle relative to the intended travel path, wherein the displacement error of the vehicle is determined by the controller calculating a distance of a current position of the vehicle relative to a stored position representative of the intended travel path, wherein the intended travel path is stored in a data store associated with the controller.

2. The system according to claim 1, comprising hydraulic motors, each motor being associated with a respective drive wheel for driving thereof to substantially correct the displacement error of the vehicle relative to the intended travel path, wherein the hydraulic motors are torque controlled to provide substantially the same torque to each hydraulic motor.

3. The system according to claim 1, wherein the steering assembly comprises a linkage arrangement operatively interconnecting the drive wheels and a steering actuator, wherein the steering actuator is responsive to the one or more control signals to substantially correct the displacement error of the vehicle relative to the intended travel path.

4. The system according to claim 1, further including a tool carriage assembly operatively mounted to the chassis and comprising a support section adapted to have mounted thereto a tool unit having a tool head, and an actuator; wherein in response to the displacement error of the tool head relative to the intended travel path, the actuator is responsive the one or more control signals to substantially correct the displacement error of the tool head relative to the intended travel path.

5. The system according to claim 4, wherein the tool carriage assembly comprises:
a base section connectable to the chassis of the vehicle, wherein the support section comprises side members and cross members operatively connected together so as to provide for a pivot connection between adjacent ends of the members, the support section being pivotally mounted to the base section at pivot points intermediate the ends of opposed side members so that the side members are rotatable relative to the base section; wherein in response to the displacement error of the tool head relative to the intended travel path, the actuator is responsive to the one or more control signals to rotate the side members about the pivot points relative to the chassis to substantially correct the displacement error of the tool head relative to the intended travel path; wherein the controller is configured to determine the displacement error of the tool head by calculating a distance of a current position of the tool head relative to the stored position representative of the intended travel path.

6. The system according to claim 5, wherein rotation of the side members about the pivot points cause a rotational movement of the tool unit about a pivot axis so that the tool head is displaced relative to the intended travel path.

7. The system according to claim 5, wherein said support section is a parallelogram-type linkage.

8. The system according to claim 5, wherein the vehicle is a seeding apparatus, wherein the tool unit is a seeder unit comprising a seed deposition outlet, wherein as a result of the rotation of the side members of the support section about the pivot points and relative to the chassis, the seed deposition outlet is displaced relative to the intended travel path to substantially correct seed deposition.

9. The system according to claim 1, wherein the coupling assembly is a coupling hitch for attachment to the leading vehicle, wherein the coupling hitch includes the force sensor to sense the force applied to the coupling hitch.

10. The system according to claim 1, wherein the drive wheels are responsive to the one or more control signals such that the propulsion of the vehicle is distributed between the drive wheels and the leading vehicle.

11. The system according to claim 1, wherein the displacement error of the vehicle includes a linear displacement error of the vehicle relative to the intended travel path and an angular displacement error relative to the intended travel path.

12. A system according to claim 11, wherein the controller is in communication with one or more further sensors, wherein one or more signals received from the one or more further sensors are indicative of: the current position of the vehicle; a current orientation of the vehicle; and a current offset position of the tool head; wherein the controller is configured to: calculate, based on the current position of the vehicle and the current orientation of the vehicle, the linear displacement error of the vehicle; and calculate, based on the current orientation of the vehicle, the angular displacement error of the vehicle.

13. The system according to claim 11, wherein the controller is in communication with one or more further sensors, wherein one or more signals received from the one or more further sensors are indicative of: a current position of the leading vehicle; a current orientation of the leading vehicle; a current angular displacement between the leading vehicle and the vehicle; and wherein the controller is configured to: calculate, based on the current position of the leading vehicle and the current orientation of the leading vehicle, the current position of the vehicle; calculate, based on the current angular displacement and the current orientation of the leading vehicle, a current orientation of the vehicle; calculate, based on the current position of the vehicle and the current orientation of the vehicle, the linear displacement error of the vehicle; and calculate, based on the current orientation of the vehicle, the angular displacement error of the vehicle.

14. The system according to claim 1, wherein the controller is configured to: receive a force signal from the force sensor; and generate at least some of the one or more controls signals to control the drive wheels based on a comparison of the force sensed as indicated by the force signal against one or more force thresholds.

15. The system according to claim 14, wherein the one or more force threshold values include a first force threshold and a second force threshold, wherein the controller is configured to generate at least some of the one or more control signals to: increase a drive force of the drive wheels if the sensed force is greater than or equal to the first force threshold; or decrease the drive force of the drive wheels if the sensed force is less than the second force threshold.

16. A system including:
a vehicle comprising a chassis having a forward and a rearward end, a traction drive comprising at least two drive wheels operatively mounted to the chassis for causing propulsion of the vehicle, a steering assembly for facilitating steering of the drive wheels when in an operating mode, and a tool carriage assembly being operatively mounted on the vehicle chassis, the tool carriage assembly comprising a support section adapted to have mounted thereto a tool unit comprising a tool head; a leading vehicle connected to the vehicle by a coupling assembly; a force sensor for sensing a force applied at the coupling assembly between the vehicle and the leading vehicle; and
a control system including a controller and one or more further sensors in communication with the controller, the controller being associated with a data store, wherein the controller is configured to:
receive one or more signals from the one or more further sensors;
determine, based on the one or more signals and the stored position in the data store representative of the intended travel path, the displacement error of the vehicle relative to the intended travel path;
determine, based on the one or more signals and the stored position in the data store representative of the intended travel path, the displacement error of the tool head relative to the intended travel path; and
generate one or more control signals according to the displacement error of the vehicle relative to the intended travel path and the displacement error of the tool head relative to the intended travel path;
wherein the drive wheels and steering assembly are responsive to the one or more control signals generated in accordance with the force sensed by the force sensor and the displacement error of the vehicle relative to the intended travel path to substantially correct the displacement error of the vehicle relative to the intended travel path; and
wherein the support section is responsive to the one or more control signals to move relative to the vehicle chassis to substantially correct the displacement error of the tool head relative to the intended travel path.

17. The system according to claim 16, wherein the displacement error of the vehicle includes a linear displacement error of the vehicle relative to the intended travel path and an angular displacement error of the vehicle relative to the intended travel path, and the displacement error of the tool head includes a linear displacement error of the tool head relative to the intended travel path.

18. The system according to claim 17, wherein one or more signals received from the one or more further sensors are indicative of:
a current position of the vehicle;
a current orientation of the vehicle; and
a current offset position of the tool head;
wherein the controller is configured to:
calculate, based on the current position of the vehicle, the current orientation of the vehicle, and the current offset position of the tool head, a position of the tool head;
calculate, based on the current position of the vehicle and the current orientation of the vehicle, the linear displacement error of the vehicle;
calculate, based on the current orientation of the vehicle, the angular displacement error of the vehicle; and
calculate, based on the current position of the tool head, the linear displacement error of the tool head.

19. The system according to claim 17, wherein the one or more signals received from the one or more further sensors are indicative of:
a current position of the leading vehicle;
a current orientation of the leading vehicle;
a current angular displacement between the leading vehicle and the vehicle; and
a current offset position of the tool head
wherein the controller is configured to:
calculate, based on the current position of the leading vehicle and the current orientation of the leading vehicle, a current position of the vehicle;
calculate, based on the current angular displacement and the current orientation of the leading vehicle, a current orientation of the vehicle;
calculate, based on the current position of the vehicle, the current orientation of the vehicle, and the current offset position of the tool head, a current position of the tool head;
calculate, based on the current position of the vehicle and the current orientation of the vehicle, the linear displacement error of the vehicle;
calculate, based on the current orientation of the vehicle, the angular displacement error of the vehicle; and
calculate, based on the current position of the tool head, the linear displacement error of the tool head.

20. The system according to claim 16, wherein the controller is configured to:
receive a force signal from the force sensor; and
generate at least some of the one or more controls signals to control the drive wheels based on a comparison of the force sensed indicated by the force signal against one or more force thresholds.

21. The system according to claim 20, wherein the one or more force threshold values include a first force threshold and a second force threshold, wherein the controller is configured to generate at least some of the one or more control signals to:
increase a drive force of the drive wheels if the sensed force is greater than or equal to the first force threshold; or
decrease the drive force of the drive wheels if the sensed force is less than the second force threshold.

22. The system according to claim 16, wherein the vehicle includes a valve block having a plurality of valves which are in fluid communication with a fluid reservoir, wherein the valve block includes an electrical interface which receives the one or more control signals generated by the controller and actuates at least some of the one or more valves to hydraulically control at least one of the drive wheels, the steering assembly, and the relative movement of the support section.

23. The system according to claim 16, wherein the support section being adapted to have mounted thereto a plurality of tool units, wherein movement of the support section relative to the chassis causes simultaneous displacement of the tool head of each tool unit relative to the intended travel path.

24. The system according to claim 16, wherein the vehicle is a seeding apparatus, wherein the tool unit is a seeder unit comprising a seed deposition outlet, wherein as a result of the relative movement between the support section and the main body of the seeding apparatus, the seed deposition outlet is displaced relative to the intended travel path to substantially correct seed deposition.

25. The system according to claim 16, wherein:
the drive wheels and steering assembly are responsive to the one or more control signals to cause a first lateral position adjustment of the vehicle relative to the intended travel path;
the support section is responsive to the one or more control signals to cause a second lateral position adjustment of the tool head relative to the vehicle chassis; and
the first lateral position adjustment is supplementary to the second lateral position adjustment.

* * * * *